US012693562B2

(12) United States Patent
Qu et al.

(10) Patent No.: US 12,693,562 B2
(45) Date of Patent: Jul. 28, 2026

(54) BACKLIGHT MODULE AND DISPLAY APPARATUS

(71) Applicants: Beijing BOE Display Technology Co., Ltd., Beijing (CN); BOE Technology Group Co., Ltd., Beijing (CN)

(72) Inventors: Qingshan Qu, Beijing (CN); Haijun Shi, Beijing (CN); Changjia Fu, Beijing (CN); Wei Zhong, Beijing (CN); Zhen Wang, Beijing (CN); Zhaoshou Tian, Beijing (CN); Dan Li, Beijing (CN); Tianyang Han, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 209 days.

(21) Appl. No.: 18/730,030

(22) PCT Filed: Aug. 8, 2023

(86) PCT No.: PCT/CN2023/111737
§ 371 (c)(1),
(2) Date: Jul. 18, 2024

(87) PCT Pub. No.: WO2025/030369
PCT Pub. Date: Feb. 13, 2025

(65) Prior Publication Data
US 2026/0177860 A1 Jun. 25, 2026

(51) Int. Cl.
*G02F 1/13357* (2006.01)

(52) U.S. Cl.
CPC .. *G02F 1/133611* (2013.01); *G02F 1/133603* (2013.01); *G02F 1/133605* (2013.01); *G02F 1/133606* (2013.01)

(58) Field of Classification Search
CPC ......... G02F 1/133603; G02F 1/133605; G02F 1/133606; G02F 1/133608; G02F 1/133611
See application file for complete search history.

(56) References Cited

U.S. PATENT DOCUMENTS

2012/0287347 A1* 11/2012 Matsumoto ....... G02F 1/133605
362/296.01
2013/0188114 A1* 7/2013 Sugaya ............. G02F 1/133603
362/97.3

FOREIGN PATENT DOCUMENTS

CN 103807674 A 5/2014
CN 107357063 A 11/2017
CN 109765720 A 5/2019
(Continued)

*Primary Examiner* — Sean P Gramling
(74) *Attorney, Agent, or Firm* — ArentFox Schiff LLP; Michael Fainberg

(57) ABSTRACT
Disclosed are a backlight module and a display apparatus. The backlight module includes: a backboard and a diffusion plate arranged opposite to each other, and a middle bezel arranged along an edge of the backboard and abutting against the diffusion plate; and a plurality of light-emitting devices on a side of the backboard facing the diffusion plate. The light-emitting device of the plurality of light-emitting devices located on an outermost side is a first light-emitting device, and in a first direction of the middle bezel pointing toward the first light-emitting device, the light-emitting device nearest the first light-emitting device is a second light-emitting device.

20 Claims, 24 Drawing Sheets

(56) References Cited

FOREIGN PATENT DOCUMENTS

| | | | |
|---|---|---|---|
| CN | 210865431 | U | 6/2020 |
| CN | 211979368 | U | 11/2020 |
| CN | 213149433 | U | 5/2021 |
| CN | 113311619 | A | 8/2021 |
| KR | 10-2023-0023091 | A | 2/2023 |

* cited by examiner

Emergence angle

15/24

After optimization

BACKLIGHT MODULE AND DISPLAY APPARATUS

CROSS-REFERENCE TO RELATED APPLICATIONS

The disclosure is a National Stage of International Application No. PCT/CN2023/111737, filed on Aug. 8, 2023, which is hereby incorporated by reference in its entirety.

TECHNICAL FIELD

The present disclosure relates to the technical field of display, in particular to a backlight module and a display apparatus.

BACKGROUND

There are usually different degrees of attenuation in brightness around a display, resulting in a certain width of dark band near a splicing seam position in a splicing screen product (as shown in FIG. 1), which will significantly affect a visual effect.

However, restricted by a current process, a physical splicing seam of the splicing screen temporarily cannot be reduced, so how to ameliorate the dark band around the display has become an urgent technical problem.

SUMMARY

Embodiments of the present disclosure provide a backlight module and a display apparatus, for solving the above technical problem existing in the prior art.

In a first aspect, in order to solve the above technical problem, an embodiment of the present disclosure provides a backlight module, including: a backboard and a diffusion plate arranged opposite to each other, and a middle bezel arranged along an edge region of the backboard, where the middle bezel abuts against the diffusion plate; and a plurality of light-emitting devices on a side of the backboard facing the diffusion plate; where the light-emitting device located on an outermost side among the plurality of light-emitting devices is a first light-emitting device; and in a first direction of the middle bezel pointing toward the first light-emitting device, the light-emitting device nearest the first light-emitting device is a second light-emitting device. A distance between the first light-emitting device and an inner side wall of the middle bezel, and a distance between the first light-emitting device and the second light-emitting device meet that: a first major light beam emitted by the first light-emitting device toward the middle bezel is reflected by the middle bezel and then projected to a position between an orthographic projection of the first light-emitting device on the diffusion plate and an orthographic projection of the second light-emitting device on the diffusion plate, and a second major light beam emitted by the second light-emitting device toward the middle bezel passes through an abutting position of the middle bezel and the diffusion plate.

In a possible implementation, a distance between the second light-emitting device and the inner side wall of the middle bezel meets that: at least a main light ray emitted by the second light-emitting device toward a side of the first light-emitting device at a minimum main light-emitting angle passes through the abutting position; or, at least a main light ray emitted by the second light-emitting device toward the side of the first light-emitting device at a maximum main light-emitting angle passes through the abutting position.

In a possible implementation, a distance between the second light-emitting device and the inner side wall of the middle bezel ranges from $OD/\tan c_2$ to $OD/\tan b_2$; where OD is spacing between the backboard and the diffusion plate, $b_2$ is a complement angle of the maximum main light-emitting angle of the second light-emitting device, and $c_2$ is a complement angle of the minimum main light-emitting angle of the second light-emitting device.

In a possible implementation, the distance between the first light-emitting device and the inner side wall of the middle bezel is in a range of $1/3\ OD/\tan c_1 \le L1 \le 1/3\ OD/\tan b_1$; where L1 is the distance between the first light-emitting device and the inner side wall of the middle bezel; $b_1$ is a complement angle of a maximum main light-emitting angle of the first light-emitting device; and $c_1$ is a complement angle of a minimum main light-emitting angle of the first light-emitting device; where the distance between the first light-emitting device and the second light-emitting device is in a range of $2/3\ OD/\tan c_2 \le L2 \le 2/3\ OD/\tan b_2$; where L2 is the distance between the first light-emitting device and the second light-emitting device.

In a possible implementation, the distance between the first light-emitting device and the second light-emitting device is two times the distance between the first light-emitting device and the inner side wall of the middle bezel.

In a possible implementation, the middle bezel has an inclined part and a vertical part, and the vertical part is located between the inclined part and the backboard and is in contact with the backboard. The inclined part has a first reflection bevel toward the side where the first light-emitting device is located and abuts against the diffusion plate. An inclination angle of the first reflection bevel meets that: the second major light beam is at least partially projected on the first reflection bevel, and the second major light beam after being reflected by the first reflection bevel is perpendicular to the diffusion plate; or, an edge of the second major light beam passes through the abutting position of the first reflection bevel and the diffusion plate.

In a possible implementation, a range of the inclination angle is: $(90°-c_2)/2 \le \delta \le (90°-b_2)/2$; where $\delta$ is the inclination angle, $c_2$ is the complement angle of the minimum main light-emitting angle of the second light-emitting device, and $b_2$ is the complement angle of the maximum main light-emitting angle of the second light-emitting device.

In a possible implementation, the position where the middle bezel abuts against the diffusion plate has a support surface, and the support surface is parallel to the diffusion plate.

In a possible implementation, a length of an orthographic projection of the first reflection bevel on the diffusion plate in the first direction meets that: a first major light beam emitted by the first light-emitting device toward a side of the middle bezel is projected on the vertical part, and the first major light beam after being reflected by the vertical part is projected on a position of the diffusion plate corresponding to a region between the first light-emitting device and the second light-emitting device.

In a possible implementation, a length of the first reflection bevel in the first direction is: $L4=(OD-L1\times\tan c_1)\times\tan \delta$; where L4 is the length of the first reflection bevel in the first direction, OD is the spacing between the backboard and the diffusion plate, L1 is the distance between the first light-emitting device and the middle bezel, $c_1$ is the complement angle of the minimum main light-emitting angle of the first light-emitting device, and $\delta$ is the inclination angle of the first reflection bevel.

In a possible implementation, the middle bezel includes: a first body of the inclined part; where the first body has a first face, a second face, a bevel and a connection structure connected sequentially; the first face intersects with the diffusion plate; the second face is parallel to and not in contact with the diffusion plate; the bevel is located on a side of the first face close to the first light-emitting device, and an end of the bevel abuts against the diffusion plate; and the connection structure extends from the second face toward a side of the backboard, and is perpendicular to the second face; and a first reflection structure on a side of the first body close to the first light-emitting device, where one part of the first reflection structure belongs to the inclined part, and the other part of the first reflection structure belongs to the vertical part.

In a possible implementation, an end of the connection structure away from the diffusion plate is not in contact with a side of the backboard facing the diffusion plate, and the connection structure has a mounting hole in the first direction. The backboard includes: a second body, parallel to the diffusion plate; and a frame, along an edge of the second body, extending toward the diffusion plate to arrive at a side of the connection structure away from the first light-emitting device, where the frame has a through hole penetrating through the frame at a position corresponding to the mounting hole, and a connection member passes through through hole and the mounting hole to fixedly connect the frame to the connection structure.

In a possible implementation, in a second direction of the diffusion plate pointing toward the backboard, the frame has bending portions at two ends of the through hole, and a thread is provided in the through hole.

In a possible implementation, the connection structure extends from the second face to a side of the backboard facing the diffusion plate and is perpendicular to the second face; and an end of the connection structure away from the diffusion plate abuts against the backboard, and a surface of the connection structure away from the first reflection structure is flush with the first face and an end face of the diffusion plate.

In a possible implementation, a longitudinal profile of the connection structure is in an L shape. An end, away from a second part parallel to the diffusion plate, of a first part of the L shape perpendicular to the diffusion plate is connected to the second face; and the second part is located on a side of the backboard close to the diffusion plate.

In a possible implementation, the backboard includes a first region and a second region surrounding the first region, and a distance between a part of the backboard located in the first region and the diffusion plate is less than a distance between a part of the backboard located in the second region and the diffusion plate. The second part is located in the second region, and a height of the second part is a height difference between the part of the backboard in the first region and the part of the backboard in the second region.

In a possible implementation, the second part further includes a protrusion, and the protrusion is located on a side of the second part close to the diffusion plate.

In a possible implementation, the first body further includes: a vertical structure on a side of the connection structure close to the light emitting device, where a side of the vertical structure close to the light emitting device is connected to the bevel, and a side of the vertical structure close to the diffusion plate is connected to the second face.

In a possible implementation, the vertical structure further has an extending portion, where an end of the extending portion away from the diffusion plate extends toward the side where the first light-emitting device is located; and the extending portion is parallel to the diffusion plate and in contact with a side of the backboard close to the diffusion plate.

In a possible implementation, the first body further includes: a transition structure, connected between the vertical structure and the second face, where a side of the transition structure facing the side where the first light-emitting device is located is connected between the bevel and a side of the vertical structure, and the side of the vertical structure facing the side where the first light-emitting device is located.

In a possible implementation, the backlight module further includes a reflection sheet, and the reflection sheet is located on a side of the backboard facing the diffusion plate.

In a possible implementation, the first body is integrally formed by adopting an injection molding process, and the first reflection structure is a reflection film. A material adopted by the first body is a metal, and the reflection sheet on the side of the backboard facing the diffusion plate extends along a surface of the first body facing the side where the first light-emitting device is located to the diffusion plate, to form the first reflection structure.

In a possible implementation, the backlight module further includes: a second reflection structure, fixed to the side of the backboard facing the diffusion plate, and located between the first light-emitting device and the second light-emitting device; where the second reflection structure has a second reflection bevel, and the second reflection bevel is used for reflecting a third major light beam formed by main light rays emitted by the first light-emitting device toward a side where the second light-emitting device is located, the third major light beam illuminates a region surrounding a position where the middle bezel abuts against the diffusion plate, and the second reflection structure does not block the second major light beam.

In a possible implementation, the second reflection structure further includes: a vertical face, facing the second light-emitting device and intersecting with the second reflection bevel; and a bottom face, located on the side of the backboard facing the diffusion plate, and connecting the vertical face to the second reflection bevel.

In a possible implementation, a height of the vertical face meets that: a main light ray emitted by the first light-emitting device toward the second reflection bevel at the minimum main light-emitting angle arrives at the diffusion plate after being reflected by the second reflection bevel; and the vertical face does not block the main light ray emitted by the second light-emitting device toward the side of the first light-emitting device at the maximum main light-emitting angle. An included angle of the second reflection bevel and the vertical face meets that: a main light ray emitted by the first light-emitting device toward the second reflection bevel at the maximum main light-emitting angle intersects with the second reflection bevel, and arrives at the middle bezel after being reflected by the second reflection bevel.

In a possible implementation, the included angle meets the following constraints: $\tan(180°+b_1-2\gamma)\geq(L5-H1)/(L3-L5)$; and $\tan(180°+c_1-2\gamma)\leq(OD-H)/(L1+L3)$. Where $L5=L3(\tan c_1-\tan b_1)/(\tan\gamma-\tan b_1)$; $H1=L3\times\tan c-L3\times\tan\gamma(\tan c_1-\tan b_1)/(\tan\gamma-\tan b_1)$; and $\gamma$ is the included angle, $b_1$ is the complement angle of the maximum main light-emitting angle of the first light-emitting device, $c_1$ is the complement angle of the minimum main light-emitting angle of the first light-emitting device, L1 is the distance between the first light-emitting device and the middle bezel, L2 is the distance between the first light-emitting device and the second light-emitting device, L3 is a distance between the first light-emitting device and the vertical face, the vertical face is parallel to a centerline of the first light-emitting device, H is the height of the vertical face, and OD is the spacing between the backboard and the diffusion plate.

In a possible implementation, the height of the vertical face meets the following constraint: $H=(L2-L3)\times\tan b_1=L3\times\tan c_1$; where H is the height of the vertical face.

In a possible implementation, the second reflection structure further includes: a plurality of fixing structures, one end of each fixing structure is connected to the bottom face of the second reflection structure, and the other end of each fixing structure has a hook extending in a direction where the second reflection structure is located.

In a possible implementation, the second reflection structure and the plurality of fixing structures are integrally formed by adopting an injection molding process.

In a second aspect, an embodiment of the present disclosure provides a display apparatus, including: the backlight module according to the first aspect; and a display panel, located on a light emergence surface of the backlight module.

Figure 1:
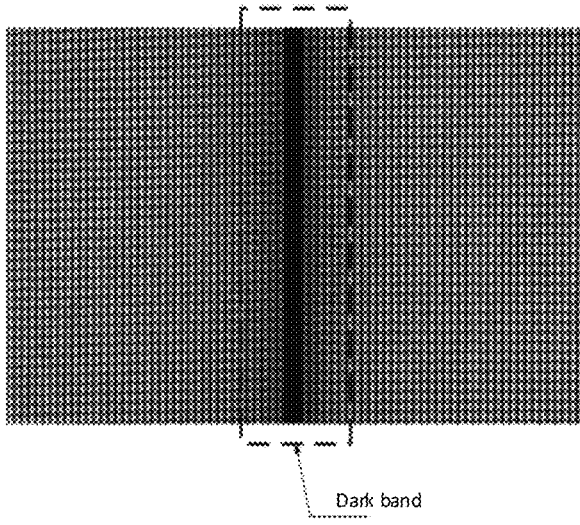
FIG. 1 is a schematic diagram of a dark frame attached to a splicing seam in a splicing screen in the related art provided by an embodiment of the present disclosure.

Reference numerals: backboard 1, diffusion plate 2, middle bezel 3, light-emitting device 4, first light-emitting device 4a, second light-emitting device 4b, second reflection structure 5, second reflection bevel 51, first major light beam 4a1, second major light beam 4b1, third major light beam 4a2, vertical face 52, bottom face 53, fixing structure 54, first reflection bevel 3s, first body 31, first reflection structure 32, first face 311, second face 312, bevel 313, support surface 3m, connection structure 314, second body 11, frame 12, mounting hole K, through hole K', bending portion 121, reflection sheet 6, vertical structure 315, and transition structure 316; and first direction X, second direction Y, minimum main light-emitting angle $\alpha$ of first light-emitting device, maximum main light-emitting angle $\beta$ of first light-emitting device, included angle $\gamma$, minimum main light-emitting angle $\alpha'$ of second light-emitting device, maximum main light-emitting angle $\beta'$ of second light-emitting device, and inclination angle $\delta$ of first reflection bevel.

DETAILED DESCRIPTION

Embodiments of the present disclosure provide a backlight module and a display apparatus, for solving the above technical problem existing in the prior art.

In order to make above objectives, features and advantages of the present disclosure more obvious and understandable, the present disclosure will be further described below in conjunction with accompanying drawings and the embodiments. However, example implementations can be implemented in a variety of forms and should not be construed as limited to the implementations set forth herein; and on the contrary, providing these implementations makes the present disclosure more comprehensive and complete, and comprehensively communicates the concept of the example implementations to those skilled in the art. In the figures, the same reference numerals represent the same or similar structures, so their repeated descriptions will be omitted. Words expressing positions and directions described in the present disclosure are illustrated by taking the accompanying drawings as examples, but may also be changed as needed, and all changes are contained in the protection scope of the present disclosure. The accompanying drawings of the present disclosure are only used for illustrating relative positional relationships and do not represent true scales.

It needs to be noted that specific details are set forth in the following description to facilitate a full understanding of the present disclosure. However, the present disclosure can be implemented in many other ways different from those described here, and those skilled in the art may make similar promotions without violating the connotation of the present disclosure. Therefore, the present disclosure is not limited by specific implementations disclosed below. Subsequent descriptions of the specification are preferred implementations for implementing the present disclosure, but the descriptions are intended to illustrate general principles of the present disclosure and are not used for limiting the scope of the present disclosure. The protection scope of the present disclosure shall be as defined in the appended claims.

A backlight module and a display apparatus provided by embodiments of the present disclosure are specifically described below in conjunction with the accompanying drawings.

Figure 2:
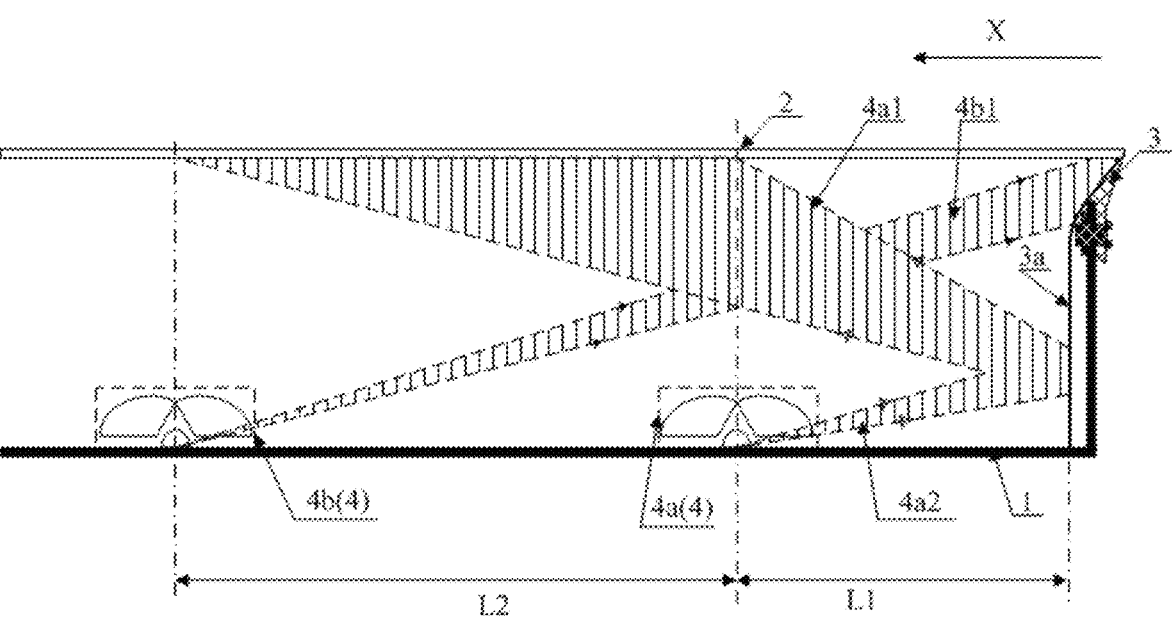
FIG. 2 is a schematic structural diagram of a backlight module provided by an embodiment of the present disclosure.

Please refer to FIG. 2 which is a schematic structural diagram of a backlight module provided by an embodiment of the present disclosure. The backlight module includes:

a backboard 1 and a diffusion plate 2 arranged opposite to each other, and a middle bezel 3 arranged along an edge region of the backboard 1, where the middle bezel 3 abuts against the diffusion plate 2; and a plurality of light-emitting devices 4 on a side of the backboard 1 facing the diffusion plate 2, where the light-emitting device 4 located on an outermost side among the plurality of light-emitting devices 4 is a first light-emitting device 4a; and in a first direction X of the middle bezel 3 pointing toward the first light-emitting device 4a, the light-emitting device 4 nearest the first light-emitting device 4a is a second light-emitting device 4b. A distance L1 between the first light-emitting device 4a and an inner side wall 3a of the middle bezel 3, and a distance L2 between the first light-emitting device 4a and the second light-emitting device 4b meet that: a first major light beam 4a1 emitted by the first light-emitting device 4a toward the middle bezel 3 is reflected by the middle bezel 3 and then projected to a position between an orthographic projection of the first light-emitting device 4a on the diffusion plate 2 and an orthographic projection of the second light-emitting device 4b on the diffusion plate 2, and a second major light beam 4b1 emitted by the second light-emitting device 4b toward the middle bezel 3 passes through an abutting position of the middle bezel 3 and the diffusion plate 2.

Figure 3:
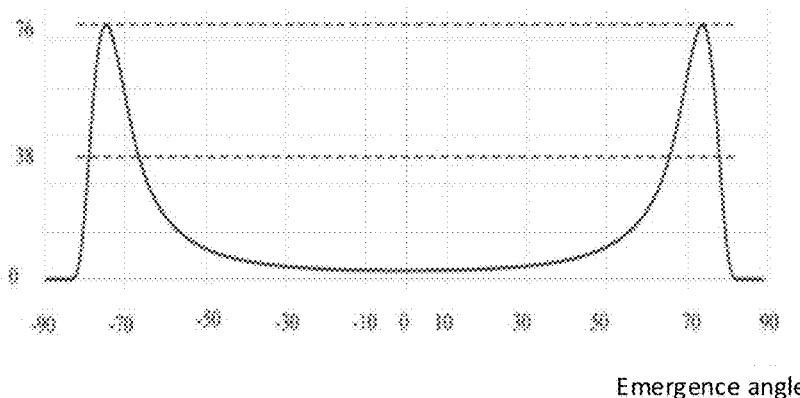
FIG. 3 is a curve graph of brightness of a light-emitting device provided by an embodiment of the present disclosure.

Please refer to FIG. 3 which is a curve graph of brightness of a light-emitting device provided by an embodiment of the present disclosure. A horizontal axis in FIG. 3 is an emergence angle of a light ray emitted from the light-emitting device 4, and a vertical axis is the brightness of the light-emitting device 4. A maximum emergence angle corresponding to half of maximum brightness is usually referred to as a maximum main light-emitting angle, and a minimum emergence angle is referred to as a minimum main light-emitting angle. Light rays emitted at emergence angles between the minimum main light-emitting angle and the maximum main light-emitting angle are referred to as main light rays, and a light beam formed by all the main light rays of one light-emitting device 4 is referred to as a major light beam. With respect to a brightness curve of the light-emitting device 4 shown in FIG. 3, the maximum brightness is 76, and half of the maximum brightness is 38. The minimum main light-emitting angle corresponding to the brightness of 38 is roughly 60°, and the maximum main light-emitting angle is roughly 80°. Two peaks shown in FIG. 3 correspond to two sides of the light-emitting device 4 respectively, such as the first light-emitting device 4a shown in FIG. 2. It is assumed that a peak corresponding to a side of the first light-emitting device 4a facing the middle bezel 3 is the peak of 10° ~ 90° shown in FIG. 3, and a peak corresponding to a side of the first light-emitting device 4a facing the second light-emitting device 4b is the peak of −10°~−90° shown in FIG. 3.

In the present disclosure, in order to distinguish major light beams emitted by the first light-emitting device 4a and the second light-emitting device 4b, the major light beam emitted by the first light-emitting device 4a toward a side of the middle bezel is referred to as the first major light beam (denoted as 4a1), the major light beam emitted by the first light-emitting device 4a toward a side of the second light-emitting device 4b is referred to as a third major light beam (denoted as 4a2), and the major light beam emitted by the second light-emitting device 4b toward a side of the first light-emitting device 4a (i.e., the middle bezel 3) is referred to as the second major beam (denoted as 4b1). Each major light beam emitted by each light-emitting device 4 in FIG. 2 resembles a radial horn shape as a whole.

As shown in FIG. 2, by adjusting the distance L1 between the first light-emitting device 4a and the inner side wall of the middle bezel 3, the first major light beam 4a1 emitted by the first light-emitting device 4a toward the side of the middle bezel 3 arrives at the position between the orthographic projection of the first light-emitting device 4a and the orthographic projection of the second light-emitting device 4a on the diffusion plate 2 after being reflected by the inner side wall 3a of the middle bezel 3, so as to prevent the first major light beam 4a1 from entering a region between the projection position of the first light-emitting device 4a and the abutting position of the middle bezel 3 and the diffusion plate 2 and illuminating the same region with other major light beams, which causes a bright band to appear in the corresponding region. At the same time, the first major light beam 4a1 can further be prevented from entering a region on a side of the projection position of the second light-emitting device 4b away from the middle bezel 3, which causes a dark band to appear between the projection position of the first light-emitting device 4a and the projection position of the second light-emitting device 4b.

By adjusting the distance L2 between the first light-emitting device 4a and the second light-emitting device 4b, the second major light beam 4b1 emitted by the second light-emitting device 4b toward the side of the middle bezel 3 passes through the position where the diffusion plate 2 abuts against the middle bezel 3, so that brightness near the abutting position of the diffusion plate 2 and the middle bezel 3 (i.e., an edge of the backlight module) can be improved.

Therefore, in the embodiments provided by the present disclosure, by adjusting the distance L1 between the first light-emitting device 4a and the inner side wall 3a of the middle bezel 3, and the distance L2 between the first light-emitting device 4a and the second light-emitting device 4b, the second major light beam 4b1 passes through the abutting position of the middle bezel 3 and the diffusion plate 2, and it is possible to cause the second major beam $4b1$ emitted by the second light-emitting device $4b$ toward the side of the first light-emitting device $4a$ (also the middle bezel 3) to illuminate the edge of the backlight module, so as to improve the brightness of the edge of the backlight module. Moreover, the first major light beam $4a1$ emitted by the first light-emitting device $4a$ toward the middle bezel 3 is reflected by the inner side wall $3a$ of the middle bezel 3 and then projected to the position between an orthographic projection of the first light-emitting device $4a$ and an orthographic projection of the second light-emitting device $4b$ on the diffusion plate 2 to prevent the bright band and the dark band from appearing at the edge of the backlight module, thus uniformity of the brightness of the edge of the backlight module is effectively improved, and a dark frame at the edge of the backlight module is effectively ameliorated.

Figure 4:
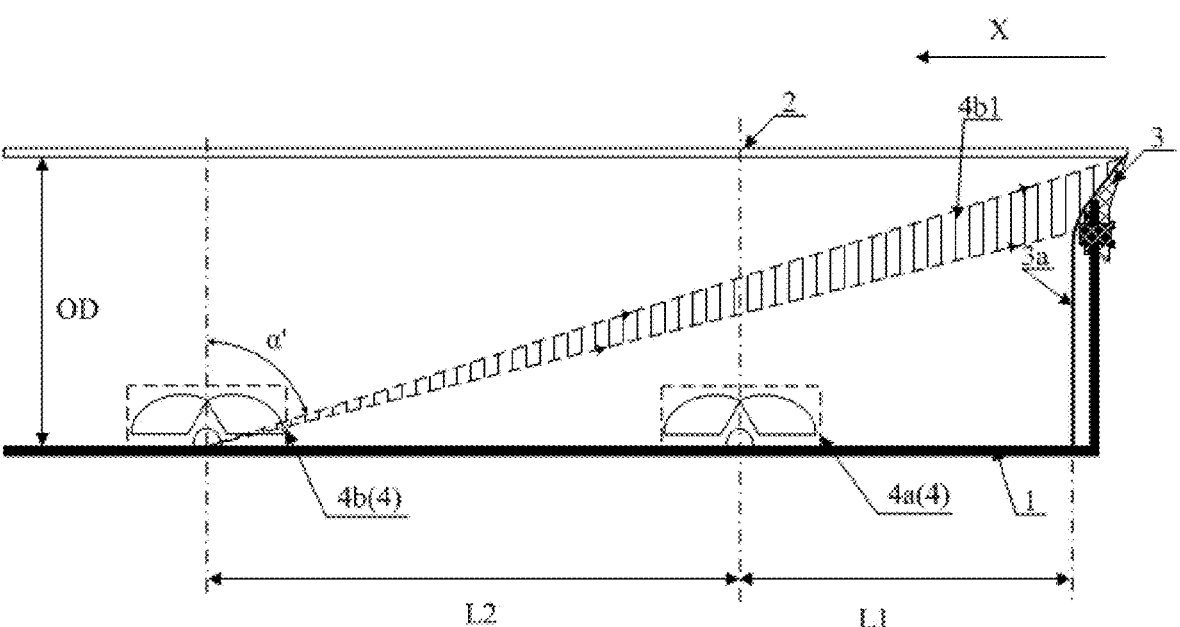
FIG. 4 and FIG. 5 are schematic diagrams of main light rays at an edge of a second major light beam illuminating an edge of a backlight module provided by embodiments of the present disclosure.
Figure 5:
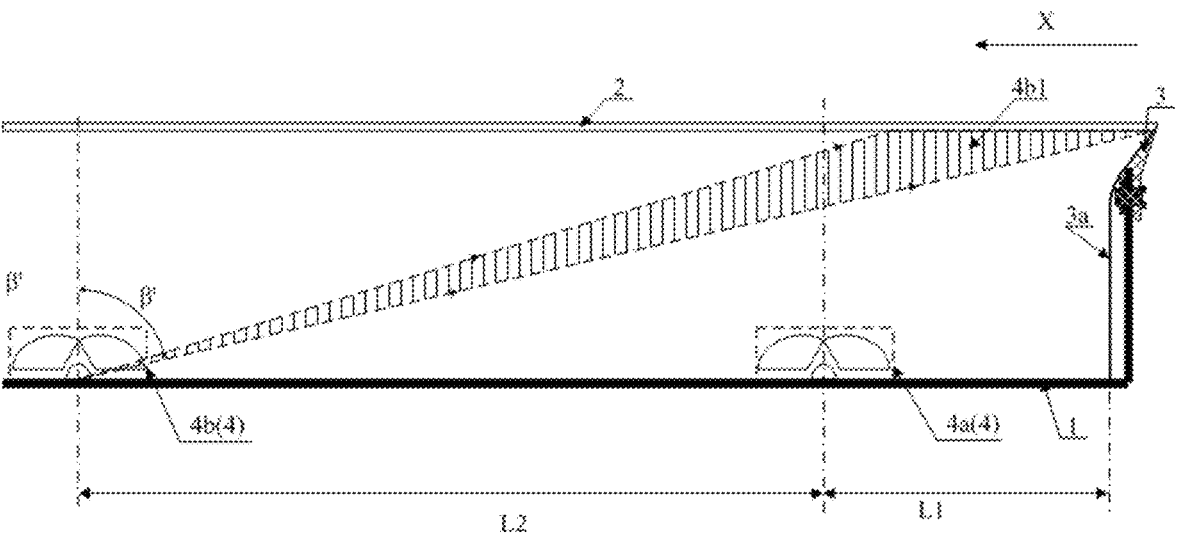

Please refer to FIG. 4 and FIG. 5 which are schematic diagrams of main light rays at an edge of a second major light beam illuminating an edge of a backlight module provided by embodiments of the present disclosure. A distance (L1+L2) between the second light-emitting device $4b$ and the inner side wall $3a$ of the middle bezel 3 meets that: as shown in FIG. 4, at least a main light ray emitted by the second light-emitting device $4b$ toward the side of the first light-emitting device $4a$ at the minimum main light-emitting angle $\alpha'$ passes through the abutting position, so that the second major light beam $4b1$ may illuminate a vicinity of the middle bezel 3 close to the abutting position while the edge of the second major light beam $4b1$ passes through the edge of the backlight module, and thus the inner side wall $3a$ of the middle bezel 3 may reflect the second major light beam $4b1$ to an edge of the diffusion plate 2, improving the brightness of the edge of the backlight module; or, as shown in FIG. 5, at least a main light ray emitted by the second light-emitting device $4b$ toward the side of the first light-emitting device at the maximum main light-emitting angle $\beta'$ passes through the abutting position, so that the second major light beam $4b1$ may directly illuminate the edge of the diffusion plate 2 up to the abutting position of the diffusion plate 2 and the middle bezel 3, thus improving the brightness of the edge of the backlight module.

In the embodiments provided by the present disclosure, by controlling the distance (L1+L2) between the second light-emitting device $4b$ and the inner side wall $3a$ of the middle bezel 3, at least the light ray emitted by the second light-emitting device $4b$ toward the side of the first light-emitting device $4a$ at the minimum main light-emitting angle $\alpha'$ passes through the abutting position, or the light ray emitted toward the side of the first light-emitting device at the maximum main light-emitting angle $\beta'$ passes through the abutting position, so that it may be ensured that at least the main light rays at the edge of the second major light beam $4b1$ pass through the abutting position of the middle bezel 3 and the diffusion plate 2, so as to be able to effectively improve the brightness of the edge of the backlight module and ameliorate the dark frame.

Please continue to refer to FIG. 4 and FIG. 5, the distance (L1+L2) between the second light-emitting device $4b$ and the inner side wall $3a$ of the middle bezel 3 ranges from OD/tan $c_2$ to OD/tan $b_2$. Herein, OD is spacing between the backboard 1 and the diffusion plate 2, $b_2$ is a complement angle of the maximum main light-emitting angle $\beta'$ of the second light-emitting device $4b$ (i.e., $b_2=90°-\beta'$), and $c_2$ is a complement angle of the minimum main light-emitting angle $\alpha'$ of the second light-emitting device $4b$ (i.e., $c_2=90°-\alpha'$).

In the embodiments provided by the present disclosure, by setting the range of the distance (L1+L2) between the second light-emitting device $4b$ and the inner side wall $3a$ of the middle bezel 3 to OD/tan $c_2$-OD/tan $b_2$, it may be ensured that the second major light beam $4b1$ emitted by the second light-emitting device $4b$ toward the side of the middle bezel 3 passes through the abutting position of the middle bezel 3 and the diffusion plate 2, so as to be able to improve the brightness of the edge of the backlight module and ameliorate the dark frame at the edge.

In some embodiments, the distance L1 between the first light-emitting device $4a$ and the inner side wall $3a$ of the middle bezel 3 is in a range of 1/3 OD/tan $c_1 \leq L1 \leq 1/3$ OD/tan $b_1$; here, L1 is the distance between the first light-emitting device and the inner side wall of the middle bezel; $b_1$ is a complement angle of a maximum main light-emitting angle $\beta$ of the first light-emitting device (i.e., $b_1=90°-\beta$); and $c_1$ is a complement angle of a minimum main light-emitting angle $\alpha$ of the first light-emitting device (i.e., $c_1=90°-\alpha$).

The distance L2 between the first light-emitting device $4a$ and the second light-emitting device $4b$ is in a range of 2/3 OD/tan $c_2 \leq L2 \leq 2/3$ OD/tan $b_2$; here, L2 is the distance between the first light-emitting device and the second light-emitting device.

The first light-emitting device $4a$ and the second light-emitting device $4b$ may be light-emitting devices having the same main light-emitting angle, and in this case, $\alpha=\alpha'$ (correspondingly $c_1=c_2$), and $\beta=\beta'$ (correspondingly $b_1=b_2$). The first light-emitting device $4a$ and the second light-emitting device $4b$ may also be light-emitting devices having different main light-emitting angles, and in this case, $a \neq a'$ (correspondingly $c_1 \neq c_2$), and $\beta \neq \beta'$ (correspondingly $b_1 \neq b_2$).

In the embodiments provided by the present disclosure, the range of the distance L1 between the first light-emitting device $4a$ and the inner side wall $3a$ of the middle bezel 3 is set as 1/3 OD/tan $c_1 \leq L1 \leq 1/3$ OD/tan $b_1$, where $b_1$ is the complement angle of the maximum main light-emitting angle $\beta$ of the first light-emitting device, and $c_1$ is the complement angle of the minimum main light-emitting angle $\alpha$ of the first light-emitting device, and the range of the distance L2 between the first light-emitting device $4a$ and the second light-emitting device $4b$ is set as 2/3 OD/tan $c_2 \leq L2 \leq 2/3$ OD/tan $b_2$, so that the first major light beam $4a1$ may be reflected by the inner side wall $3a$ of the middle bezel 3 and then projected to the position between the projection position of the first light-emitting device $4a$ and the projection position of the second light-emitting device $4b$, and the main light rays in the second major light beam $4b1$ pass through the abutting position of the diffusion plate 2 and the middle bezel 3.

Figure 6:
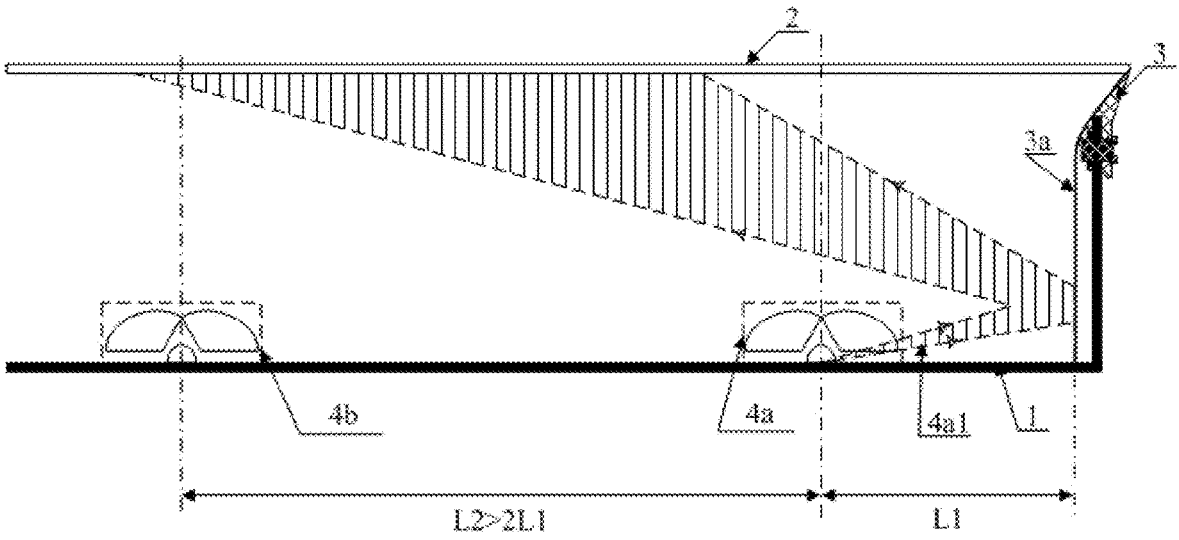
FIG. 6-FIG. 8 are schematic diagrams of a light path of a first major light beam provided by embodiments of the present disclosure.
Figure 7:
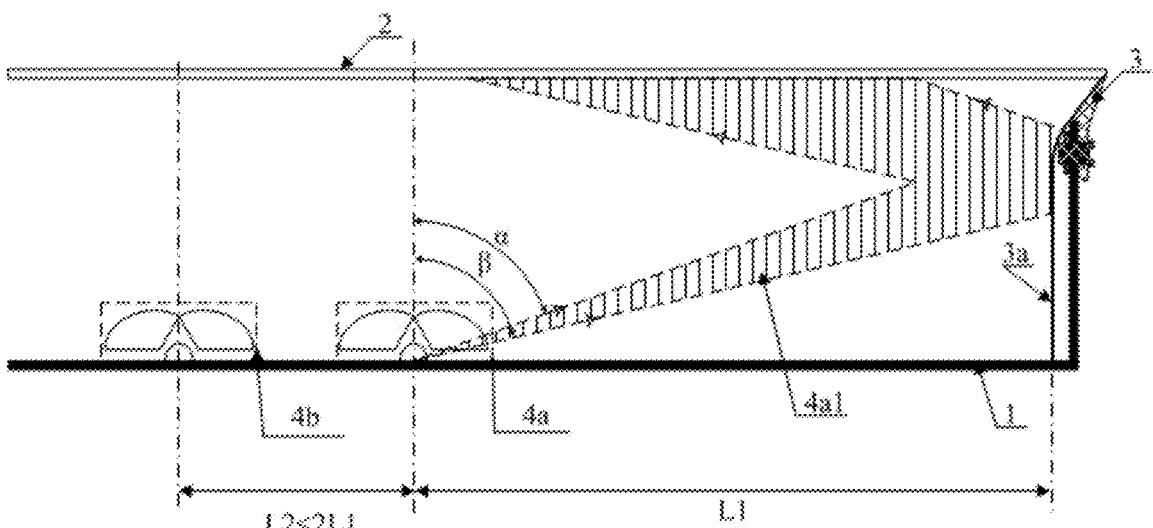
Figure 8:
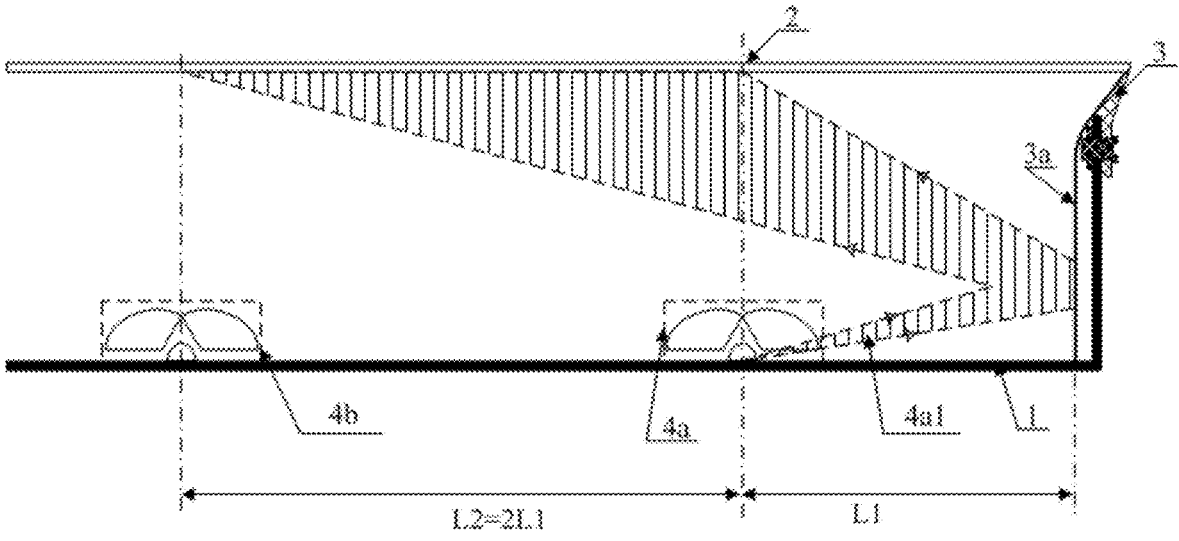

Please refer to FIG. 6-FIG. 8 which are schematic diagrams of a light path of a first major light beam provided by embodiments of the present disclosure.

As shown in FIG. 6, if $L2>2L1$, after the first major light beam $4a1$ is reflected by the inner side wall $3a$ of the middle bezel 3, at least part of the first major light beam $4a1$ is located on the side of the projection position of the second light-emitting device $4b$ away from the middle bezel 3, resulting in the existence of a dark region in the region between the projection positions of the first light-emitting device $4a$ and the second light-emitting device $4b$.

As shown in FIG. 7, if $L2<2L1$, after the first major light beam $4a1$ is reflected by the inner side wall $3a$ of the middle bezel 3, at least part of the first major light beam $4a1$ is located in the region between the projection position of the first light-emitting device $4a$ and the middle bezel 3, so that there is a bright region in the region between the projection position of the first light-emitting device $4a$ and the middle bezel $3$.

As shown in FIG. 8, the distance L2 between the first light-emitting device $4a$ and the second light-emitting $4b$ is two times the distance L1 between the first light-emitting device $4a$ and the inner side wall $3a$ of the middle bezel $3$, i.e., L2=2L1. In this case, the first major light beam $4a1$ emitted by the first light-emitting device $4a$ toward the side of the middle bezel $3$ is reflected by the inner side wall $3a$ of the middle bezel $3$ to the region between the projection positions of the first light-emitting device $4a$ and the second light-emitting device $4b$ on the diffusion plate $2$, so that it may be ensured that there is no dark region between the projection positions of the first light-emitting device $4a$ and the second light-emitting device $4b$, and that there is no bright region in the region between the first light-emitting device $4a$ and the middle bezel $3$.

Therefore, in the embodiments provided by the present disclosure, by setting the distance L2 between the first light-emitting device $4a$ and the second light-emitting device $4b$ to be two times the distance L1 between the first light-emitting device $4a$ and the inner side wall of the middle bezel $3$, not only may it be ensured that there is no dark region between the first light-emitting device $4a$ and the second light-emitting device $4b$, but also the brightness of the edge region of the backlight module can be uniform.

Figure 9:
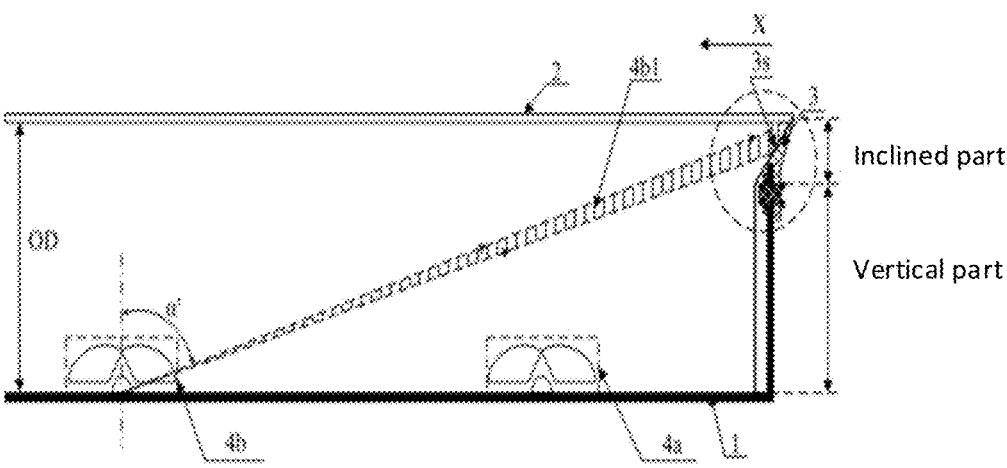
FIG. 9 is a schematic structural diagram of a backlight module provided by an embodiment of the present disclosure.
Figure 10:
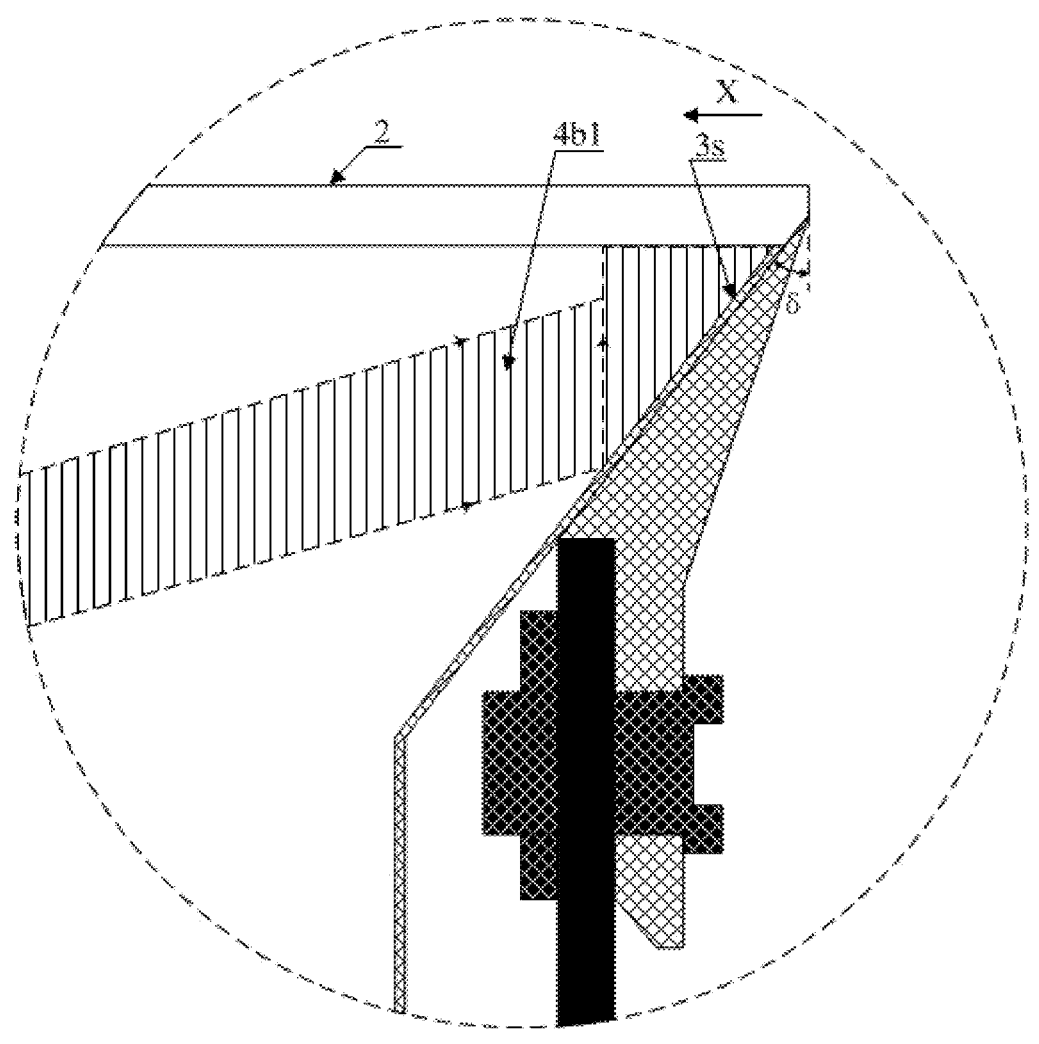
FIG. 10 is an enlarged partial diagram of the backlight module in FIG. 9 corresponding to a region of a middle bezel provided by an embodiment of the present disclosure.

Please refer to FIG. 9 and FIG. 10, FIG. 9 is a schematic structural diagram of a backlight module provided by an embodiment of the present disclosure, and FIG. 10 is an enlarged partial diagram of the backlight module in FIG. 9 corresponding to a region of a middle bezel provided by an embodiment of the present disclosure. As shown in FIG. 9, the middle bezel $3$ has an inclined part and a vertical part, and the vertical part is located between the inclined part and the backboard $1$ and is in contact with the backboard $1$. The inclined part has a first reflection bevel $3s$ toward the side where the first light-emitting device $4a$ is located and abuts against the diffusion plate $2$; and the first reflection bevel $3s$ is a part, belonging to the inclined part, of the inner side wall $3a$ of the middle bezel $3$.

As shown in FIG. 10, an inclination angle $\delta$ of the first reflection bevel $3s$ meets that: the second major light beam $4b1$ is at least partially projected on the first reflection bevel $3s$, and the second major light beam $4b1$ after being reflected by the first reflection bevel $3s$ is perpendicular to the diffusion plate $2$; or, the edge of the second major light beam $4b1$ passes through an abutting position of the first reflection bevel $3s$ and the diffusion plate $2$.

In the embodiments provided by the present disclosure, the second major light beam $4b1$ emitted by the second light-emitting device $4b$ toward the side of the middle bezel $3$ is at least partially projected on the first reflection bevel $3s$, and the second major light beam $4b1$ after being reflected by the first reflection bevel $3s$ is perpendicular to the diffusion plate $2$, or the edge of the second major light beam $4b1$ passes through the abutting position of the first reflection bevel $3s$ and the diffusion plate $2$, so that the second major light beam $4b1$ may illuminate the edge region of the diffusion plate $2$, thus improving the brightness of the edge region of the backlight module.

Figure 11:
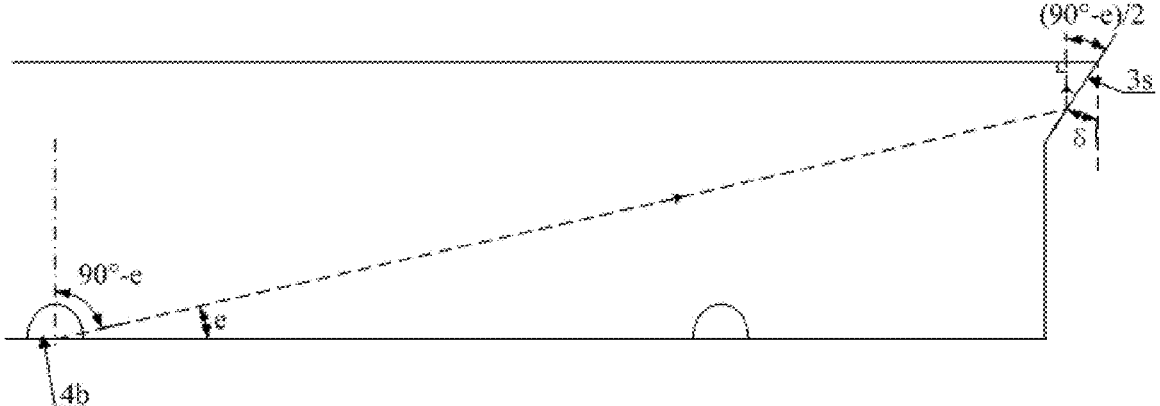
FIG. 11 is a constraint mathematical model of an inclination angle of a first reflection bevel provided by an embodiment of the present disclosure.

Please refer to FIG. 11, FIG. 11 is a constraint mathematical model of an inclination angle of a first reflection bevel $3s$ provided by an embodiment of the present disclosure.

In FIG. 11, it is assumed that a main light ray emitted by the second light-emitting device $4b$ toward the side of the middle bezel $3$ has an emergence angle of $(90°-e)$, and e is a complement angle of the emergence angle of this main light ray. When arriving at the first reflection bevel $3s$, this main light ray is reflected by the first reflection bevel $3s$ to the diffusion plate $2$, and is incident on the diffusion plate $2$ at an angle perpendicular to the diffusion plate $2$. Therefore, it may be determined that the inclination angle of the first reflection bevel $3s$ is $\delta=(90°-e)/2$. In addition, $\alpha'\leq(90°-e)\leq\beta'$, and therefore $\alpha'1/2\leq\delta\leq\beta'/2$.

The range of the inclination angle of the first reflection bevel $3s$ may also be expressed as: $(90°-c_2)/2\leq\delta\leq(90°-b_2)/2$; where $\delta$ is the inclination angle of the first reflection bevel $3s$, $c_2$ is the complement angle of the minimum main light-emitting angle $\alpha'$ of the second light-emitting device $4b$ (i.e., $c_2=90°-\alpha'$), and $b_2$ is the complement angle of the maximum main light-emitting angle $\beta'$ of the second light-emitting device $4b$ (i.e., $b_2=90°-\beta'$).

In the embodiments provided by the present disclosure, by setting the inclination angle of the first reflection bevel $3s$ of the middle bezel $3$ within the range of $(90°-c_2)/2\leq\delta\leq(90°-b_2)/2$, the second major light beam $4b1$ may be at least partially projected on the first reflection bevel $3s$, and the second major light beam $4b1$ after being reflected by the first reflection bevel $3s$ is perpendicular to the diffusion plate $2$, or the edge of the second major light beam $4b1$ passes through the abutting position of the first reflection bevel $3s$ and the diffusion plate $2$.

Figure 12:
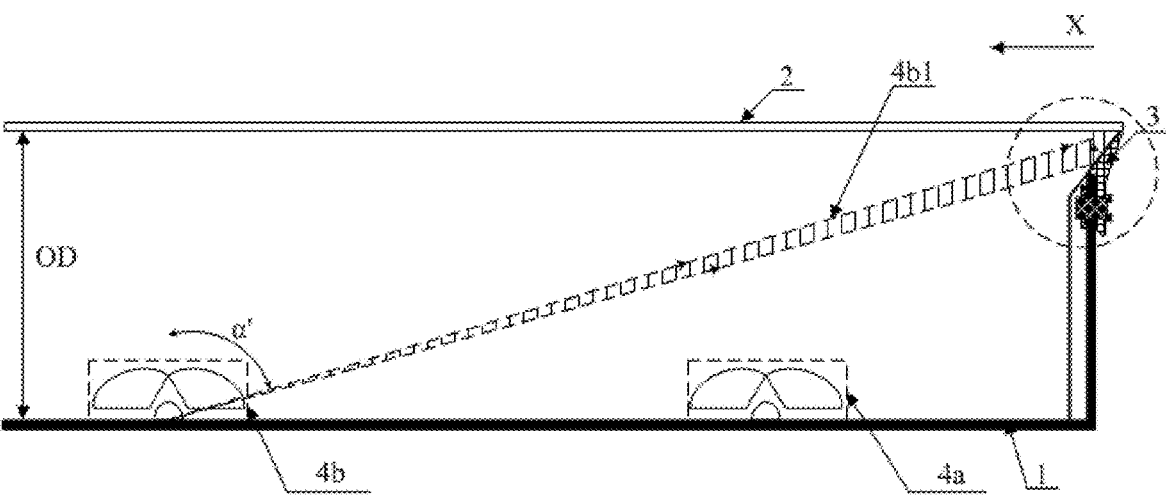
FIG. 12 is a schematic structural diagram of a backlight module provided by an embodiment of the present disclosure.
Figure 13:
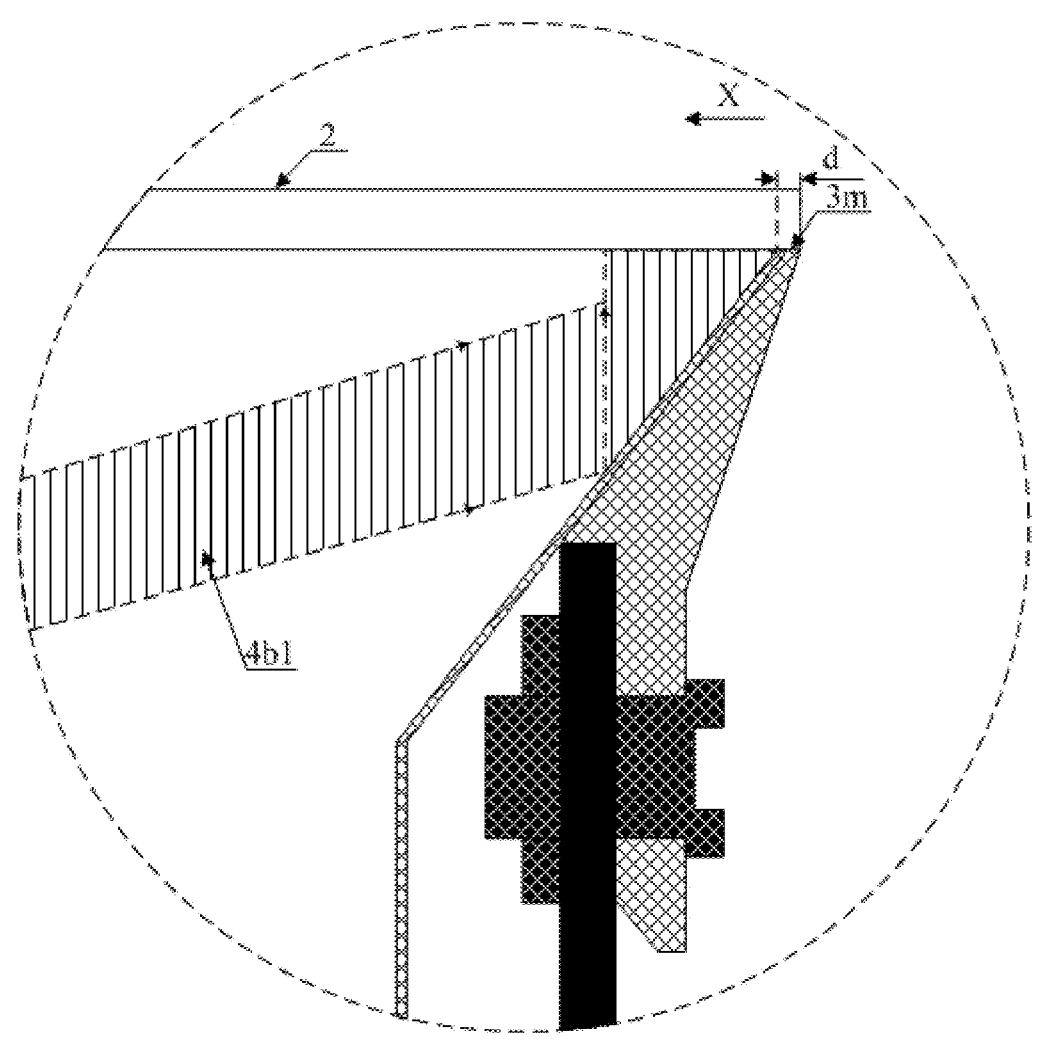
FIG. 13 is an enlarged partial diagram of a region where a middle bezel is located in FIG. 12 provided by an embodiment of the present disclosure.

Please refer to FIG. 12 and FIG. 13, FIG. 12 is a schematic structural diagram of a backlight module provided by an embodiment of the present disclosure, and FIG. 13 is an enlarged partial diagram of a region where a middle bezel is located in FIG. 12 provided by an embodiment of the present disclosure.

The position where the middle bezel $3$ abuts against the diffusion plate $2$ has a support surface $3m$, and the support surface $3m$ is parallel to the diffusion plate $2$.

A length of the support surface $3m$ in the first direction X is d, and 1 mm$\leq$d$\leq$1.5 mm.

In the embodiments provided by the present disclosure, by arranging the support surface $3m$ at the position where the middle bezel $3$ abuts against the diffusion plate $2$, the middle bezel $3$ and the diffusion plate $2$ can be assembled conveniently, and the production efficiency is improved.

Figure 14:
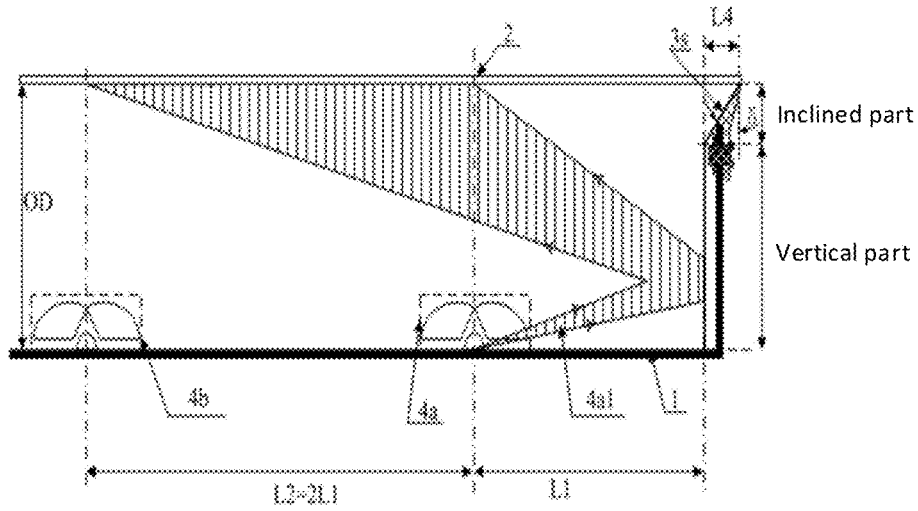
FIG. 14 is another schematic structural diagram of a backlight module provided by an embodiment of the present disclosure.

Please refer to FIG. 14 which is another schematic structural diagram of a backlight module provided by an embodiment of the present disclosure.

A length L4 of an orthographic projection of the first reflection bevel $3s$ on the diffusion plate $2$ in the first direction X meets that: the first major light beam $4a1$ emitted by the first light-emitting device $4a$ toward the side of the middle bezel $3$ is projected on the vertical part of the middle bezel $3$, so that the first major light beam $4a1$ after being reflected by the vertical part is projected on a position of the diffusion plate $2$ corresponding to a region between the projection position of the first light-emitting device and the projection position of the second light-emitting device $4b$.

In the embodiments provided by the present disclosure, the length L4 of the orthographic projection of the first reflection bevel $3s$ on the diffusion plate $2$ in the first direction X is controlled to meet that: the first major light beam $4a1$ emitted by the first light-emitting device $4a$ toward the side of the middle bezel $3$ is projected on the vertical part of the middle bezel $3$, so that the first major light beam $4a1$ after being reflected by the vertical part is projected on the position of the diffusion plate $2$ corresponding to the region between the projection position of the first light-emitting device $4a$ and the projection position of the second light-emitting device $4b$, the dark region in the region between the projection position of the first light-emitting device 4a and the projection position of the second light-emitting device 4b or the bright region in the region between the projection position of the first light-emitting device 4a and the middle bezel 3 may be prevented, and thus the brightness uniformity of the backlight module in the edge region is improved.

Please continue to refer to FIG. 14, a length of the first reflection bevel 3s in the first direction X is: $L4=(OD-L1\times \tan c_1)\times\tan \delta$; where L4 is the length of the first reflection bevel 3s in the first direction X, OD is the spacing between the backboard 1 and the diffusion plate 2, L1 is the distance between the first light-emitting device 4a and the inner side wall 3a of the middle bezel 3, $c_1$ is the complement angle of the minimum main light-emitting angle $\alpha$ of the first light-emitting device 4a (i.e., $c_1=90°-\alpha$), and $\delta$ is the inclination angle of the first reflection bevel 3s.

Figure 15:
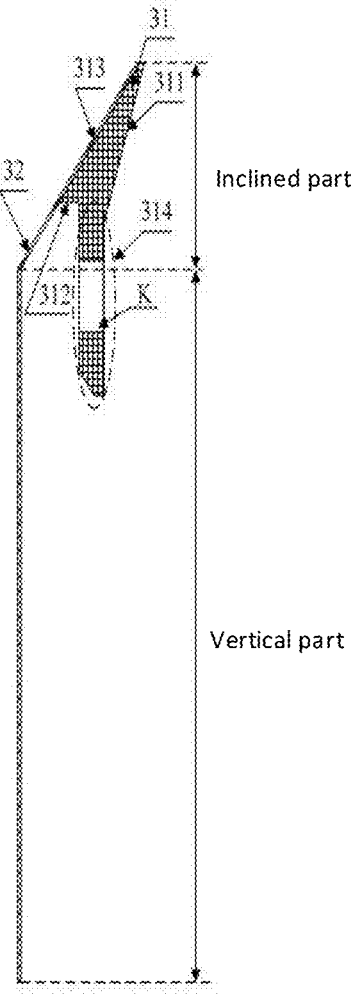
FIG. 15 is a schematic structural diagram of a middle bezel provided by an embodiment of the present disclosure.

Please refer to FIG. 15 which is a schematic structural diagram of a middle bezel provided by an embodiment of the present disclosure.

The middle bezel 3 includes:

a first body 31 of the inclined part; where the first body 31 has a first face 311, a second face 312, a bevel 313 and a connection structure 314 connected sequentially; the first face 311 intersects with the diffusion plate 2; the second face 312 is parallel to and not in contact with the diffusion plate 2; the bevel 313 is located on a side of the first face 311 close to the first light-emitting device 4a, and an end of the bevel 313 abuts against the diffusion plate 2; and the connection structure 314 extends from the second face 312 toward a side of the backboard 1, and is perpendicular to the second face 312; and a first reflection structure 32 on a side of the first body 31 close to the first light-emitting device 4a, where one part of the first reflection structure 32 belongs to the inclined part, and the other part of the first reflection structure belongs to the vertical part. A side of the first reflection structure 32 close to the first light-emitting device 4a is the inner side wall 3a of the middle bezel 3.

The first face 311 may be perpendicular to the second face 312 or at an obtuse angle to the second face 312.

Please continue to refer to FIG. 14 and FIG. 15, an end of the connection structure 314 away from the diffusion plate 2 is not in contact with a side of the backboard 1 facing the diffusion plate 2, and the connection structure 314 has a mounting hole K in the first direction X.

Figure 16:
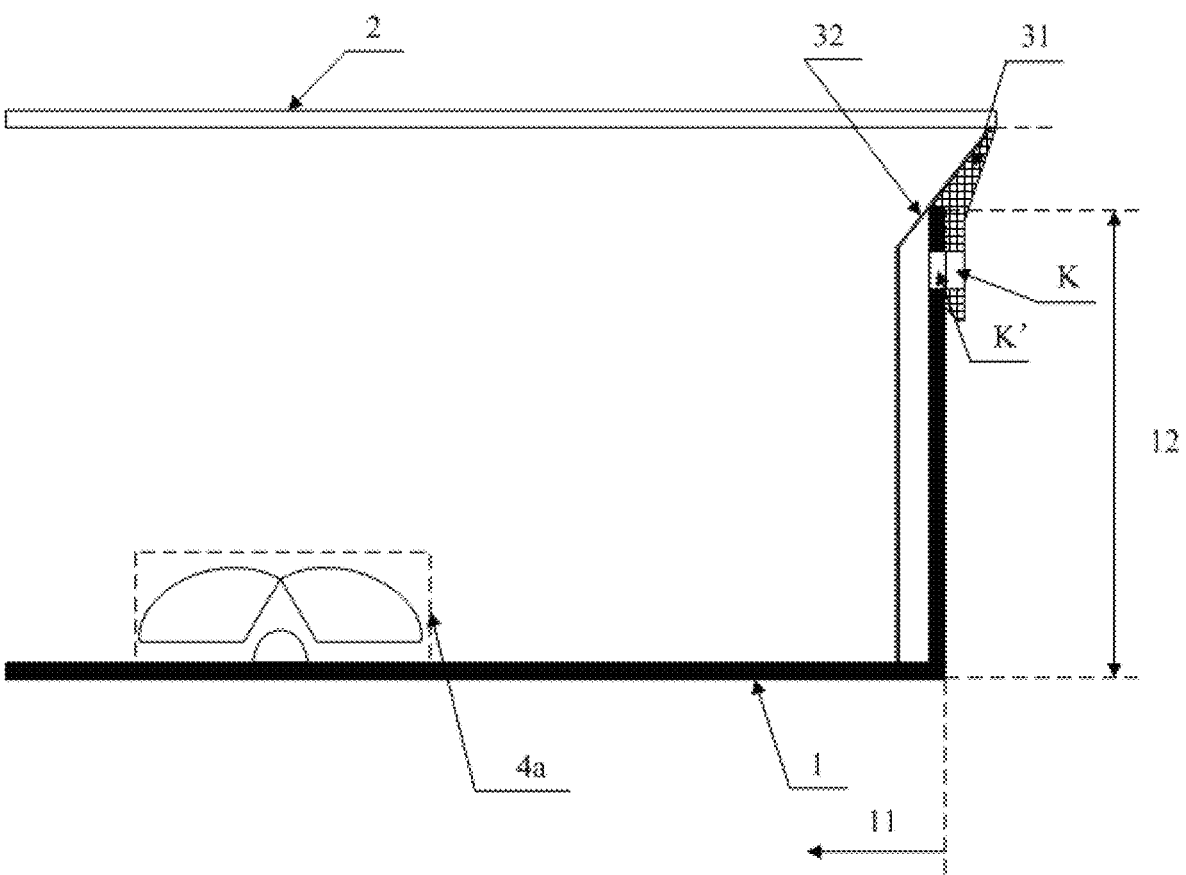
FIG. 16 is a schematic structural diagram of a backboard provided by an embodiment of the present disclosure.

Please refer to FIG. 16 which is a schematic structural diagram of a backboard provided by an embodiment of the present disclosure. The backboard 1 includes:

a second body 11 parallel to the diffusion plate 2; and a frame 12, along an edge of the second body 11, extending toward the diffusion plate 2 to arrive at a side of the connection structure 314 away from the first light-emitting device 4a; where the frame 12 has a through hole K' penetrating through the frame 12 at a position corresponding to the mounting hole K, and a connection member passes through the through hole K' and the mounting hole K to fixedly connect the frame 12 to the connection structure 314.

In this solution, the first reflection structure 32 may be a metallic reflection structure, such as a reflector. The metallic reflection structure adheres to a surface of the first body 31 facing the side where the first light-emitting device 4a is located, and extends toward the second body 11 until it comes into contact with the second body 11.

In the embodiments provided by the present disclosure, the connection structure 314 is arranged in the first body 31 of the middle bezel 3, so that the body of the middle bezel 3 is not in contact with the second body 11 of the backboard 1, and a size of the first body 31 may be made small. The backboard 1 is arranged as the second body 11 and the frame 12 extending along the edge of the second body 11 toward the diffusion plate 2, the mounting hole K connected with the frame 12 of the backboard 1 is provided in the connection structure 314, and correspondingly, the through hole K' corresponding to the mounting hole K is provided in the frame 12 of the backboard 1, so that the first body 31 of the middle bezel 3 and the frame 12 of the backboard 1 can be fixed together by the connection member, thus the difficulty in making the first body 31 can be effectively reduced, and a support can also be formed for the first body 31 of the middle bezel 3 by using the frame 12 of the backboard 1, thereby improving the support strength between the backboard 1 and the diffusion plate 2.

Figure 17:
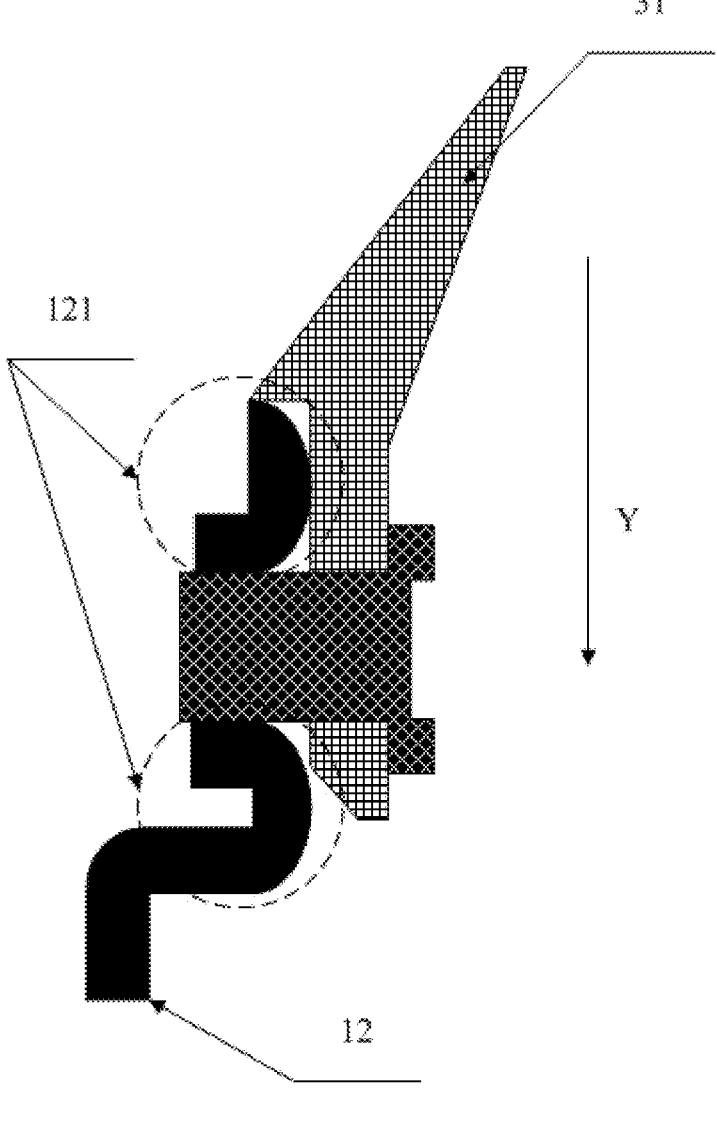
FIG. 17 is a schematic diagram of bending of a frame provided by an embodiment of the present disclosure.

Please refer to FIG. 17 which is a schematic diagram of bending of a frame provided by an embodiment of the present disclosure.

In a second direction Y of the diffusion plate 2 pointing toward the backboard 1, the frame 12 has bending portions 121 at two ends of the through hole K', and a threads is provided in the through hole K'.

In the embodiments provided by the present disclosure, a depth of the through hole K' may be increased by arranging the bending portions 121 at the two ends of the through hole K', and then the thread can be formed on an inner wall of the through hole K', so that the connection member connecting the frame 12 to the middle bezel 3 can use the threads without the need to use a nut, thus facilitating assembly and improving production efficiency, and a depth at which the middle bezel 3 intrudes into a display region of the backlight module can also be reduced.

Figure 18:
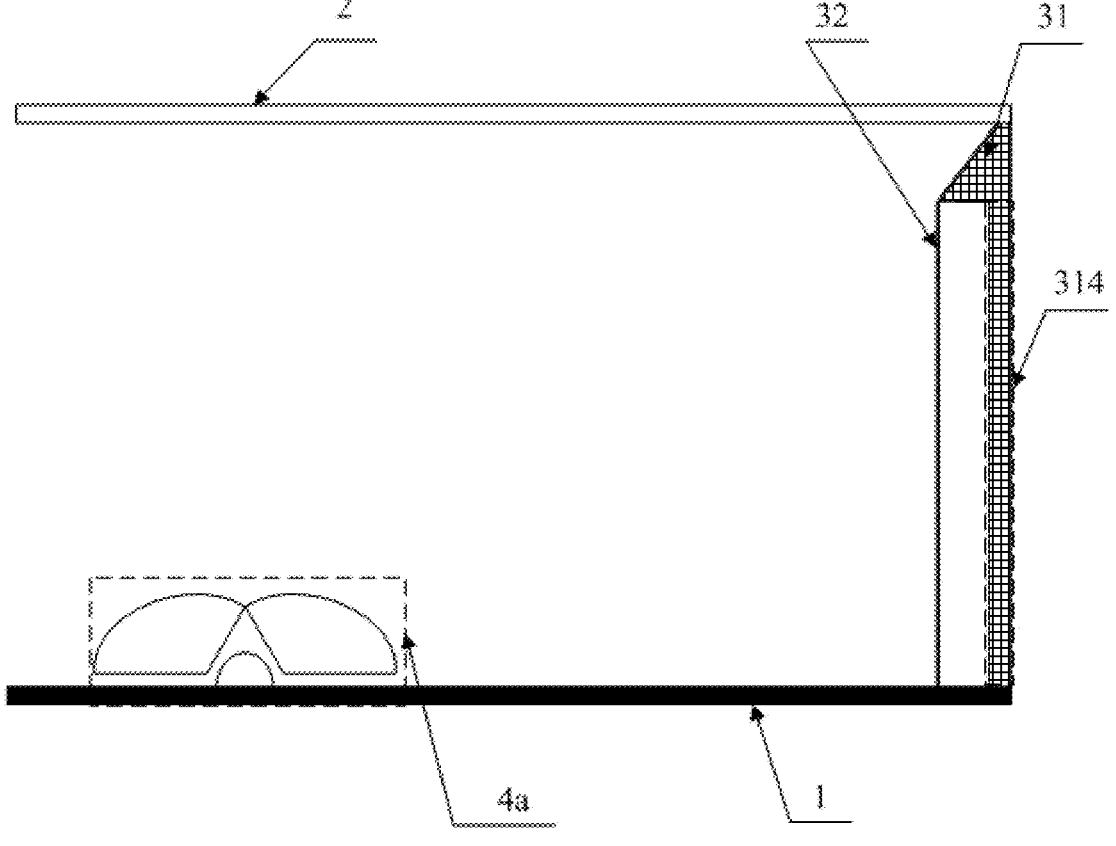
FIG. 18 is a schematic structural diagram of a middle bezel and a backboard provided by an embodiment of the present disclosure.

Please refer to FIG. 18 which is a schematic structural diagram of a middle bezel and a backboard provided by an embodiment of the present disclosure. The connection structure 314 extends from the second face 312 to the side of the backboard 1 facing the diffusion plate 2 and is perpendicular to the second face 312.

The end of the connection structure 314 away from the diffusion plate 2 abuts against the backboard 1, and a surface of the connection structure 314 away from the first reflection structure 32 is flush with the first face 311 and an end face of the diffusion plate 2.

As shown in FIG. 18, the connection structure 314 may be vertically shaped. Since the connection structure 314 is perpendicular to the second face 312 which is parallel to both the diffusion plate 2 and the backboard 1, the connection structure 314 is perpendicular to both the diffusion plate 2 and the backboard 1. Further, since the surface of the connection structure 314 away from the first reflection structure 32 is flush with the first face 311 and the end face of the diffusion plate 2, the surface of the connection structure 314 away from the first reflection structure 32 may be regarded as formed by the extension of the first face 311 toward the backboard 1, i.e., the first face 311 is perpendicular to the diffusion plate 2. In this way, in the inclined part of the middle bezel 3, the first body 31 may provide the first reflection structure 32 with the bevel 313 required for the first reflection bevel 3s, and can also provide a support for the inclined part in the vertical part, so as to allow the first body 31 to effectively support the backboard 1 and the diffusion plate 2, thus eliminating the need to arrange the frame 12 at the edge of the backboard 1 to support the middle bezel 3, and eliminating the need to form the mounting hole K in the connection structure 314, so that a process can be effectively simplified, and the production efficiency is improved.

Figure 19:
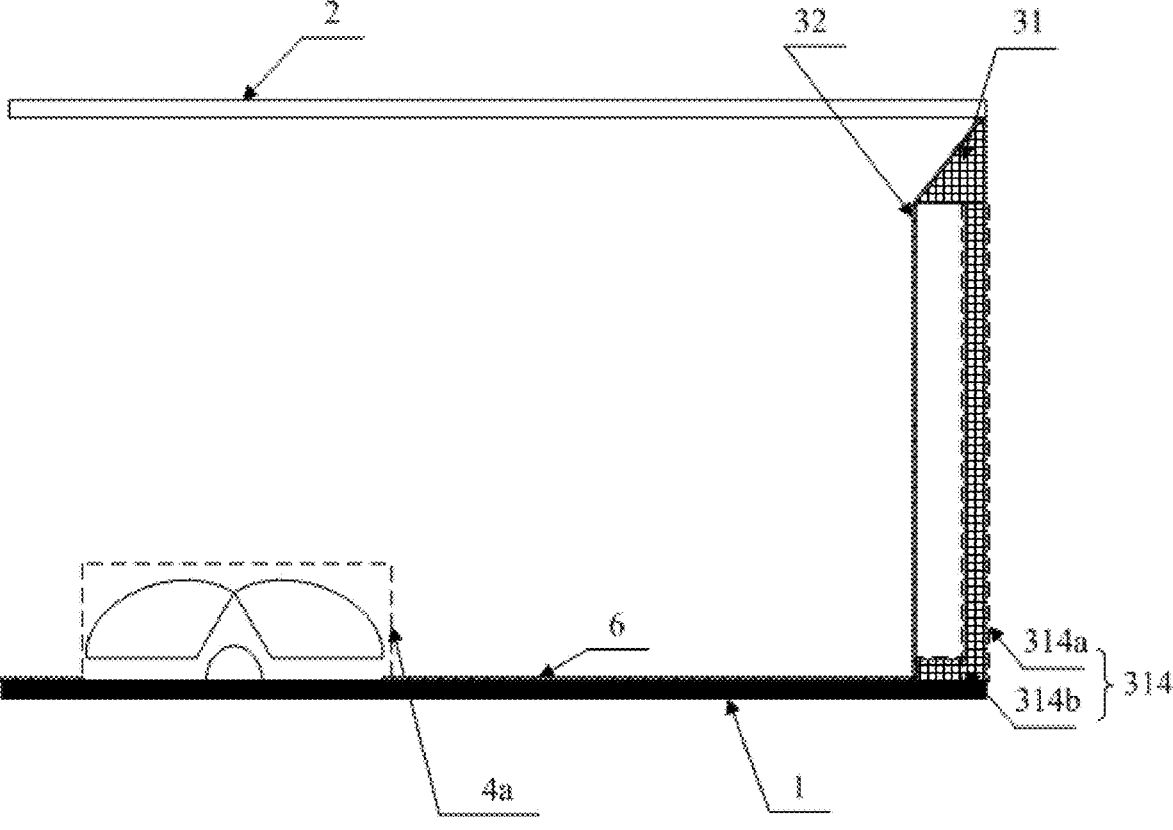
FIG. 19-FIG. 20 are another schematic structural diagrams of a middle bezel and a backboard provided by embodiments of the present disclosure.
Figure 20:
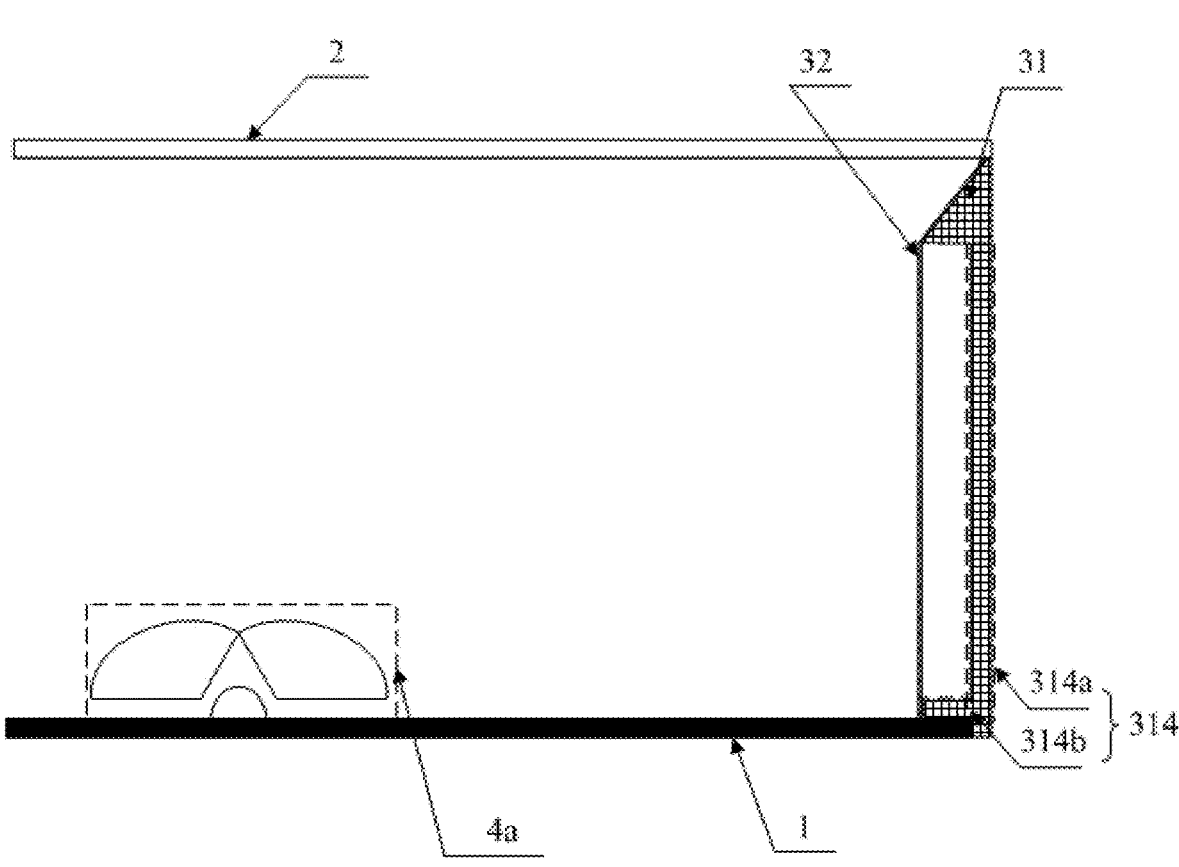

Please refer to FIG. 19-FIG. 20 which are another schematic structural diagrams of a middle bezel and a backboard provided by embodiments of the present disclosure.

A longitudinal profile of the connection structure 314 is in an L shape. An end, away from a second part 314b parallel to the diffusion plate 2, of a first part 314a of the L shape perpendicular to the diffusion plate 2 is connected to the second face 312; and the second part 314b is located on a side of the backboard 1 close to the diffusion plate 2.

As shown in FIG. 19, sides of the first part 314a and the second part 314b away from the diffusion plate 2 may both be located on the side of the backboard 1 close to the diffusion plate 2. As shown in FIG. 20, there may be a height difference between the sides of the first part 314a and the second part 314b away from the diffusion plate 2, the side of the second part 314b away from the diffusion plate 2 is attached to the side of the backboard 1 close to the diffusion plate 2, and the side of the first part 314a away from the diffusion plate 2 is flush with the side of the backboard 1 away from the diffusion plate 2.

In the embodiments provided by the present disclosure, the longitudinal profile of the connection structure 314 is arranged in the L shape; the end, away from the second part 314b parallel to the diffusion plate 2, of the first part 314a of the L shape perpendicular to the diffusion plate 2 is connected to the second face 312; and the second part 314b is located on the side of the backboard 1 close to the diffusion plate 2, which facilitates to improve support force of the first body 31 to the backboard 1 and the diffusion plate 2, and facilitates to fix a connection mechanism and the backboard 1.

Figure 21:
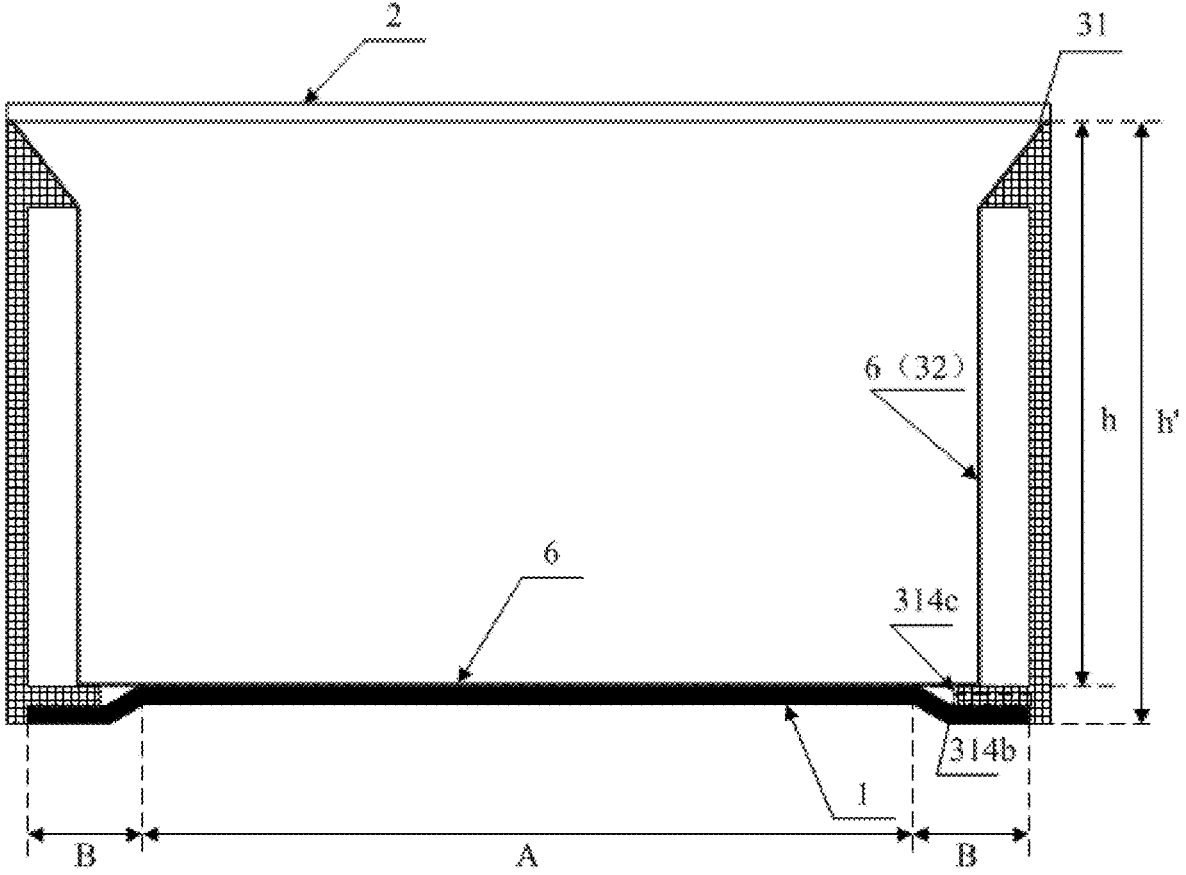
FIG. 21 is another schematic structural diagram of a middle bezel and a backboard provided by an embodiment of the present disclosure.

Please refer to FIG. 21 which is another schematic structural diagram of a middle bezel and a backboard provided by an embodiment of the present disclosure.

The backboard 1 includes a first region A and a second region B surrounding the first region A, and a distance h between a part of the backboard 1 located in the first region A and the diffusion plate 2 is less than a distance h' between a part of the backboard 1 located in the second region B and the diffusion plate 2.

The second part is located in the second region B, and a height of the second part is a height difference between the part of the backboard 1 in the first region A and the part of the backboard 1 in the second region B.

The backboard 1 is arranged to include the first region A and the second region B surrounding the first region A, and the distance h between the part of the backboard 1 located in the first region A and the diffusion plate 2 is less than the distance h' between the part of the backboard 1 located in the second region B and the diffusion plate 2; and at the same time, the second part in the connection structure 314 of the middle bezel 3 is arranged in the second region B of the backboard 1, and the height of the second part is the height difference between the part of the backboard 1 in the first region A and the part of the backboard 1 in the second region B, so that a side of the second part facing the diffusion plate 2 may be located on the same plane as a side of the part of the backboard 1 located in the first region A facing the diffusion plate 2. In this way, when a reflection sheet 6 is arranged on the surface of the backboard 1, and the reflection sheet 6 is bent and then extends toward the side of the diffusion plate 2 to be reused as the first reflection structure 32 of the middle bezel 3, the levelness of the reflection sheet

6 on the surface of the backboard 1 can be improved, and thus light rays reflected by the reflection sheet 6 are more uniform.

It needs to be understood that in FIG. 21, the light-emitting devices 4 are not shown. In practical applications, the reflection sheet 6 may not be arranged at positions where the light-emitting devices 4 are mounted, i.e., a through slot that exposes the light-emitting device 4 may be formed in a position of the reflection sheet 6 corresponding to the light-emitting device 4. In addition, since FIG. 21 is a sectional view, the second region B is located on two sides of the first region A as seen in FIG. 21, but in fact the second region B surrounds the first region.

Figure 22:
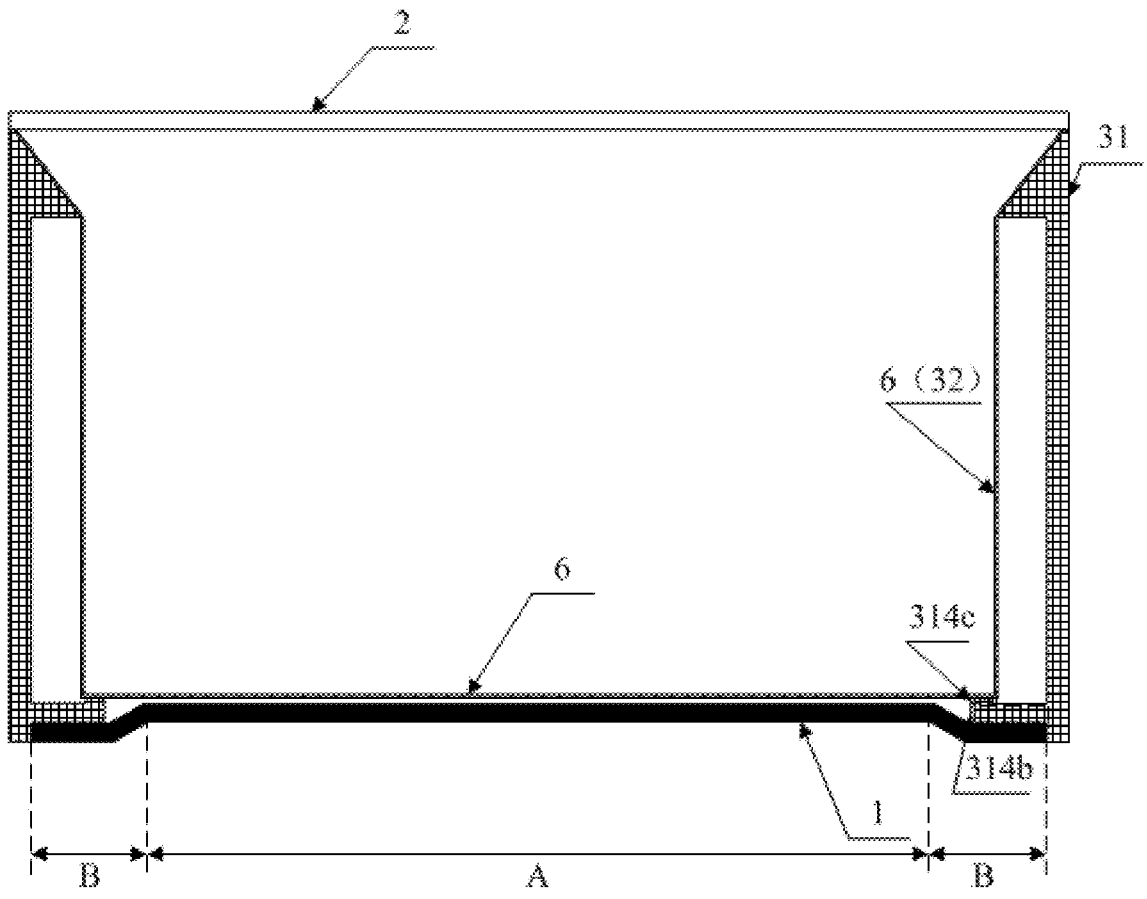
FIG. 22 is another schematic structural diagram of a middle bezel and a backboard provided by an embodiment of the present disclosure.

Please refer to FIG. 22 which is another schematic structural diagram of a middle bezel and a backboard provided by an embodiment of the present disclosure.

The second part 314b of the connection structure 314 further includes a protrusion 314c, and the protrusion 314c is located on a side of the second part 314b close to the diffusion plate 2. An end of the protrusion 314c away from the light-emitting devices 4 has spacing from the first part 314a.

Each light-emitting device 4 typically includes a circuit board, a lamp bead, and a lens; the lamp bead is arranged on a side of the circuit board facing the diffusion plate 2; and the lens is mounted on a light-emergence side of the lamp bead. Typically, a plurality of light-emitting devices are mounted on a lamp bar; a lamp body has a circuit board, a plurality of lamp beads and lenses corresponding to the lamp beads; and a plurality of lamp bars are mounted on the backboard 1 to form a backlight source. However, a thickness of each circuit board is generally larger than a thickness of the reflection sheet 6. Therefore, in the present disclosure, the protrusion 314c is arranged on the surface of the second part 314b close to the diffusion plate 2, and a thickness of the protrusion 314c is the same as the thickness of the circuit board, so that a part of the reflection sheet 6 parallel to the diffusion plate 2 may be prevented from being warped in the edge position and is maintained in a plane, and uniformity of the light rays reflected by the reflection sheet 6 is further improved.

Figure 23:
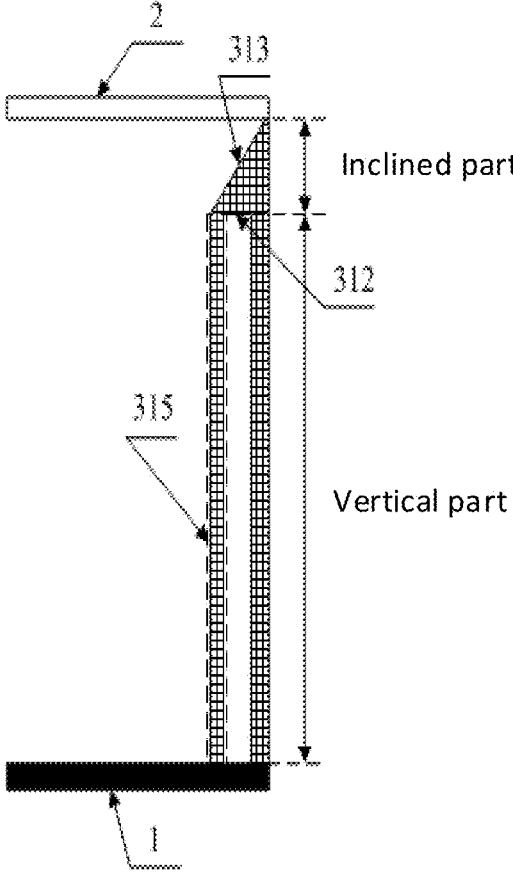
FIG. 23 and FIG. 24 are schematic structural diagrams of a first body provided by embodiments of the present disclosure.
Figure 24:
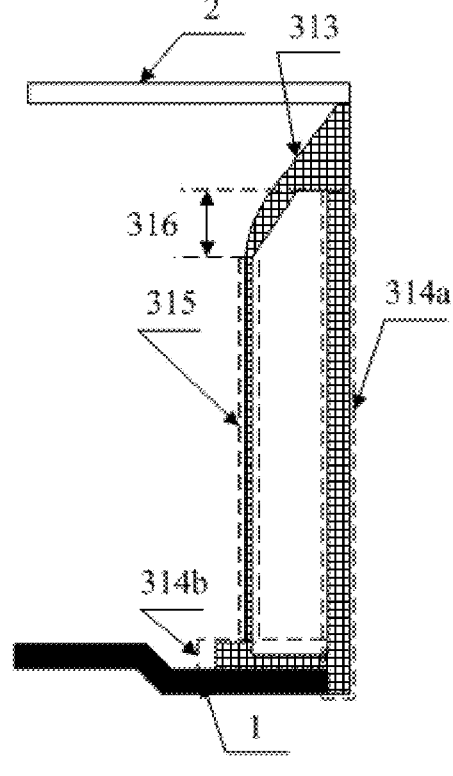

Please refer to FIG. 23 and FIG. 24 which are schematic structural diagrams of a first body provided by embodiments of the present disclosure.

The first body 31 further includes: a vertical structure 315 on a side of the connection structure 314 close to the light emitting devices 4, a side of the vertical structure 315 close to the light emitting device 4 is connected to the bevel 313, and a side of the vertical structure 315 close to the diffusion plate 2 is connected to the second face 312. The vertical structure is located in the vertical part of the middle bezel 3. As shown in FIG. 23, a side of the vertical structure 315 close to the backboard 1 may be attached to the backboard 1. As shown in FIG. 24, a side of the vertical structure 315 close to the backboard 1 may also be connected to the second part of the connection structure 314.

In the embodiments provided by the present disclosure, the vertical structure 315 is arranged on the side of the connection structure 314 close to the light emitting devices 4, the side of the vertical structure 315 close to the light emitting devices 4 is connected to the bevel 313, and the side of the vertical structure 315 close to the diffusion plate 2 is connected to the second face 312, so that the first body 31 has better stability. Moreover, it is possible to form the first reflection structure 32 by coating the side of the vertical part connected to the bevel 313 with a reflection material and coating the bevel 313 with the reflection material, so that it is not necessary to bend the reflection sheet 6, which is able to reduce the difficulty of the process and improve the production efficiency.

Please continue to refer to FIG. 24, the first body 31 further includes: a transition structure 316, connected between the vertical structure 315 and the second face 312. A side of the transition structure 316 facing the side where the first light-emitting device 4a is located is connected between the bevel 313 and a side of the vertical structure 315 facing the side where the first light-emitting device 4a is located. The side of the transition structure 316 facing the side where the first light-emitting device 4a is located may be a curved transition face, which facilitates smooth transition of the light rays at a position where the vertical part meets the inclined part, and can effectively improve the uniformity of the light.

Figure 25:
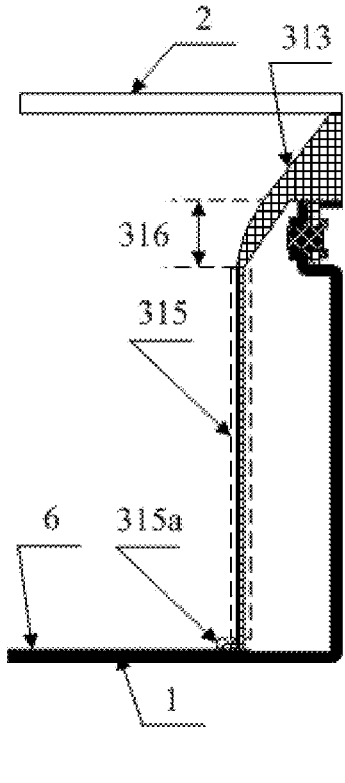
FIG. 25 is another schematic structural diagram of a middle bezel provided by an embodiment of the present disclosure.

Please refer to FIG. 25 which is another schematic structural diagram of a middle bezel provided by an embodiment of the present disclosure. The vertical structure 315 further has an extending portion 315a, an end of the extending portion 315a away from the diffusion plate 2 extends toward the side where the first light-emitting device 4a is located, and the extending portion 315a is parallel to the diffusion plate 2 and in contact with a side of the backboard 1 close to the diffusion plate 2.

By arranging the extending portion 315a at one end of the vertical structure 315 close to the backboard 1, the vertical structure 315 may be better supported when the connection structure 314 is connected to the frame 12 of the backboard 1, improving the stability of the middle bezel 3.

Please continue to refer to FIG. 25, the backlight module further includes the reflection sheet 6, and the reflection sheet 6 is located on the side of the backboard 1 facing the diffusion plate 2. In FIG. 25, the inner side wall of the middle bezel 3 formed by connecting the vertical structure 315 to the bevel 313 is coated with the reflection material to form a layer of reflection film, and the reflection film constitutes the first reflection structure 32.

In some embodiments, the first body 31 is integrally formed by adopting an injection molding process, and the first reflection structure 32 is the reflection film. Adopting injection molding to integrally form the first body 31 facilitates the manufacture of the first body 31, and a complex shape is easy to form.

A material adopted by the first body 31 is a metal, and the reflection sheet 6 located on the surface of the backboard 1 facing the diffusion plate 2 extends along a surface of the first body 31 facing a side where the first light-emitting device 4a is located to the diffusion plate 2, to form the first reflection structure 32.

Figure 26:
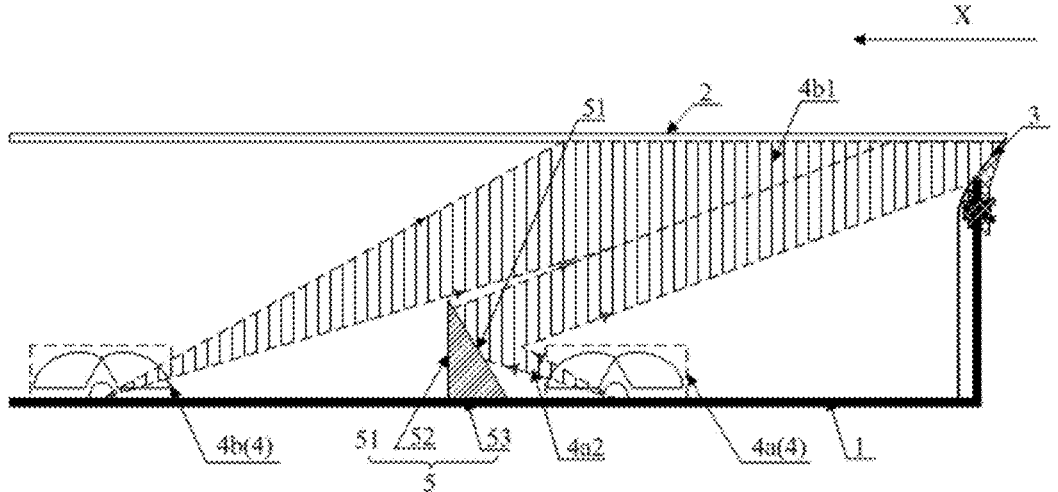
FIG. 26 is another schematic structural diagram of a backlight module provided by an embodiment of the present disclosure.

Please refer to FIG. 26 which is another schematic structural diagram of a backlight module provided by an embodiment of the present disclosure. The backlight module further includes: a second reflection structure 5, fixed to the side of the backboard 1 facing the diffusion plate 2, and located between the first light-emitting device 4a and the second light-emitting device 4b. The second reflection structure 5 has a second reflection bevel 51, and the second reflection bevel 51 is used for reflecting a third major light beam 4a2 formed by main light rays emitted by the first light-emitting device 4a toward a side where the second light-emitting device 4b is located, so that the third major light beam 4a2 illuminates a region surrounding a position where the middle bezel 3 abuts against the diffusion plate 2, and the second reflection structure 5 does not block the second major light beam 4b1 emitted by the second light-emitting device 4b toward the side of the first light-emitting device 4a.

As shown in FIG. 26, when the first light-emitting device 4a emits the third major light beam 4a2 to the side of the second light-emitting device 4b, after being reflected by the second reflection bevel 51 of the second reflection structure 5, the third major light beam illuminates the region surrounding the position where the middle bezel 3 abuts against the diffusion plate 2, so as to improve the brightness of the region surrounding the position where the middle bezel 3 abuts against the diffusion plate 2 (i.e., the edge region of the backlight module), further ameliorating the dark band at the edge region of the backlight module. When the backlight module is used as a splicing screen, as the dark band at the edge region of the backlight module is ameliorated, the dark band of the splicing screen at a splicing position can also be improved. In addition, since the second reflection structure 5 does not block the second major light beam 4b1 emitted by the second light-emitting device 4b toward the side of the first light-emitting device 4a, the second major light beam 4b1 can reach the diffusion plate 2 smoothly without appearance of a shadow region, and thus a display effect can be effectively improved.

Please continue to refer to FIG. 26, the second reflection structure 5 further includes:

a vertical face 52, facing the second light-emitting device 4b and intersecting with the second reflection bevel 51; and a bottom face 53, located on the side of the backboard 1 facing the diffusion plate 2, and connecting the vertical face 52 to the second reflection bevel 51.

The vertical face 52 of the second reflection structure 5 is non-reflective, which may reduce the reflection of light rays. The second reflection bevel 51 may be reflective by being coated with a reflection material, or may be reflective by having a reflection film layer attached to the second reflection bevel 51, which is not specifically limited.

Figure 27:
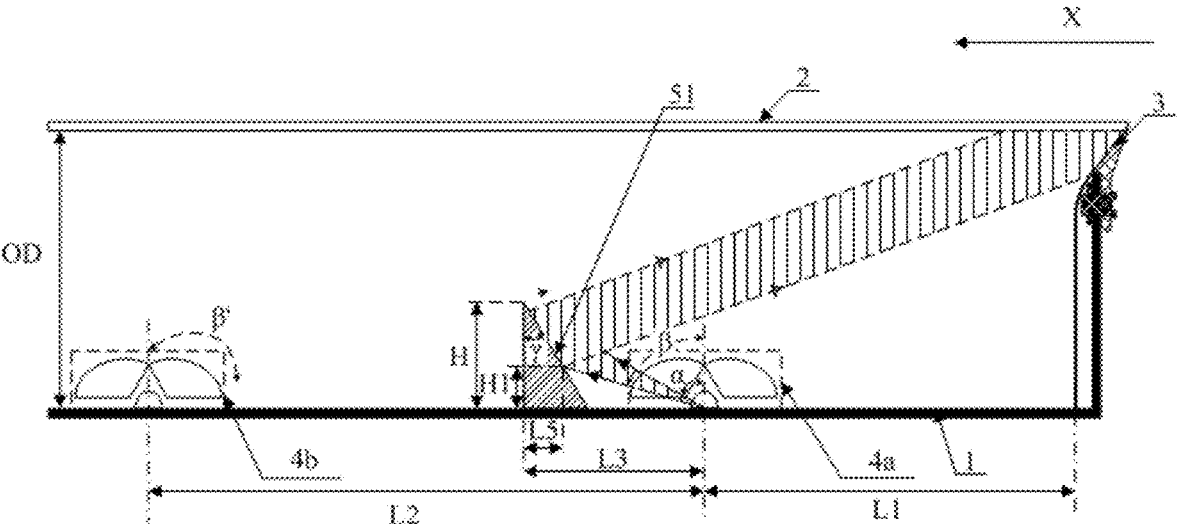
FIG. 27 is a diagram of a light path of a third major light beam provided by an embodiment of the present disclosure.

Please refer to FIG. 27 which is a diagram of a light path of a third major light beam provided by an embodiment of the present disclosure.

A height H of the vertical face 52 of the second reflection structure 5 meets that: a main light ray emitted by the first light-emitting device 4a toward the second reflection bevel 51 at the minimum main light-emitting angle $\alpha$ arrives at the diffusion plate 2 after being reflected by the second reflection bevel 51, and the vertical face 52 does not block the second major light beam 4b1 emitted by the second light-emitting device 4b toward the side of the first light-emitting device 4a at the maximum main light-emitting angle $\beta'$.

An included angle $\gamma$ of the second reflection bevel 51 of the second reflection structure 5 and the vertical face 52 meets that: a main light ray emitted by the first light-emitting device 4a toward the second reflection bevel 51 at the maximum main light-emitting angle $\beta$ intersects with the second reflection bevel 51, and arrives at the middle bezel 3 after being reflected by a reflection face. A limiting case is that an intersection of the main light ray emitted by the first light-emitting device 4a toward the reflection face at the maximum main light-emitting angle $\beta$ with the second reflection bevel 51 of the second reflection structure 5 is exactly an intersection of the second reflection bevel 51 of the second reflection structure 5 with the vertical face 52.

In the embodiments provided in the present disclosure, the height H of the vertical face 52 of the second reflection structure 5 meets that: the main light ray emitted by the first light-emitting device 4a toward the second reflection bevel 51 at the minimum main light-emitting angle $\alpha$ arrives at the diffusion plate 2 after being reflected by the second reflection bevel 51; and the included angle $\gamma$ of the second reflection bevel 51 of the second reflection structure 5 and the vertical face 52 meets that: the main light ray emitted by the first light-emitting device 4a toward the second reflection bevel 51 at the maximum main light-emitting angle β arrives at the middle bezel 3 after being reflected by the second reflection bevel 51, so that the third major light beam 4a2 emitted by the first light-emitting device 4a toward the second reflection bevel 51 may illuminate the region surrounding the position where the middle bezel 3 abuts against the diffusion plate 2 after being reflected by the second reflection structure 5, and the brightness of the region surrounding the position where the middle bezel 3 abuts against the diffusion plate 2 is further improved. The vertical face 52 does not block the second major light beam 4b1 emitted by the second light-emitting device 4b toward the side of the first light-emitting device 4a at the maximum main light-emitting angle β', which allows the second major light beam emitted by the second light-emitting device 4b toward the side of the first light-emitting device 4a not to be blocked by the second reflection structure 5 and prevents the generation of the shadow region.

Please continue to refer to FIG. 27, the included angle γ meets the following constraints: $\tan\ (180°+b_1-2\gamma)\geq(L5-H1)/(L3-L5)$; and $\tan\ (180°+c_1-2v)\leq(OD-H)/(L1+L3)$.

Here, $L5=L3\ (\tan\ c_1-\tan\ b_1)/(\tan\ \gamma-\tan\ b_1)$; and L5 is a distance from an intersection of the main light ray emitted by the first light-emitting device 4a toward the second reflection structure 5 at the maximum main light-emitting angle β with the second reflection bevel 51 to the vertical face 52.

$H1=L3\times\tan\ c-L3\times\tan\ \gamma\ (\tan\ c_1-\tan\ b_1)/(\tan\ \gamma-\tan\ b_1)$; and H1 is a distance from the intersection of the main light ray emitted by the first light-emitting device 4a toward the second reflection structure 5 at the maximum main light-emitting angle β with the second reflection bevel 51 to the backboard 1.

Here, γ is the included angle, $b_1$ is the complement angle of the maximum main light-emitting angle β of the first light-emitting device 4a (i.e., $b_1=90°-\beta$), and $c_1$ is the complement angle of the minimum main light-emitting angle α of the first light-emitting device 4a (i.e., $c_1=90°-\alpha$); and L1 is the distance between the first light-emitting device 4a and the middle bezel 3, L2 is the distance between the first light-emitting device 4a and the second light-emitting device 4b, L3 is the distance between the first light-emitting device 4a and the vertical face 52, the vertical face 52 is parallel to a centerline of the first light-emitting device 4a, H is the height of the vertical face 52, and OD is the spacing between the backboard 1 and the diffusion plate 2.

The height of the vertical face 52 meets the following constraint: $H=(L2-L3)\times\tan\ b_1=L3\times\tan\ c_1$; where H is the height of the vertical face 52 (i.e., the height of the second reflection structure 5).

The second reflection structure 5 may be fixed to the backboard 1 by adhesion, or the second reflection structure 5 may be fixed to the backboard 1 by a screw by providing the through hole K' in the backboard 1 and arranging a screw hole at the side of the bottom face 53 of the second reflection structure 5.

Figure 28:
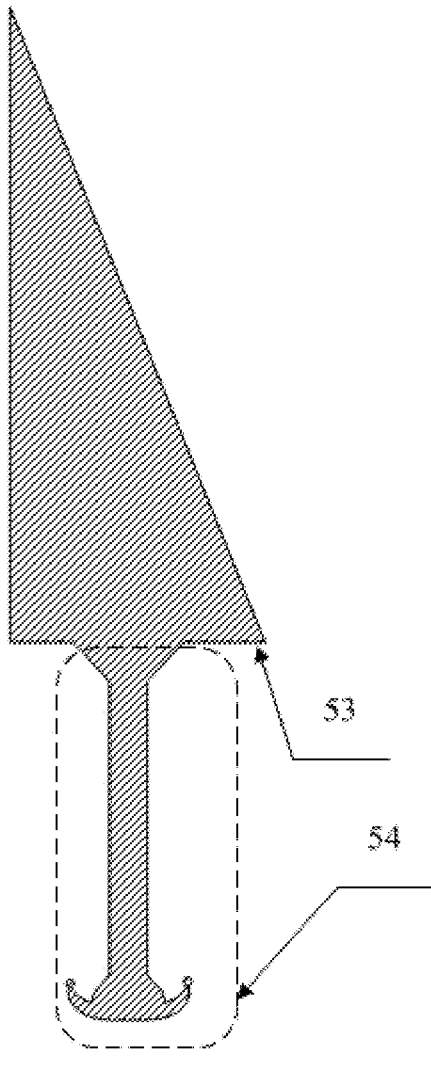
FIG. 28 is a schematic structural diagram of a second reflection structure provided by an embodiment of the present disclosure.

Please refer to FIG. 28 which is a schematic structural diagram of a second reflection structure provided by an embodiment of the present disclosure. The second reflection structure 5 further includes: a plurality of fixing structures 54; one end of each fixing structure 54 is connected to the bottom face 53 of the second reflection structure 5; and the other end of each fixing structure has a hook extending in a direction where the second reflection structure 5 is located. The fixing structures 54 may be of a buckle type.

The plurality of fixing structures 54 are arranged on the bottom face 53 of the second reflection structure 5, and at an end of each fixing structure 54 away from the second reflection structure 5, the fixing structure 54 has the hook extending in the direction where the second reflection structure 5 is located, thus facilitating fixing the second reflection structure 5 to the backboard 1.

In some embodiments, the second reflection structure 5 and the plurality of fixing structures 54 are integrally formed by adopting an injection molding process, thus facilitating production of the second reflection structure 5.

Example 1

Figure 29:
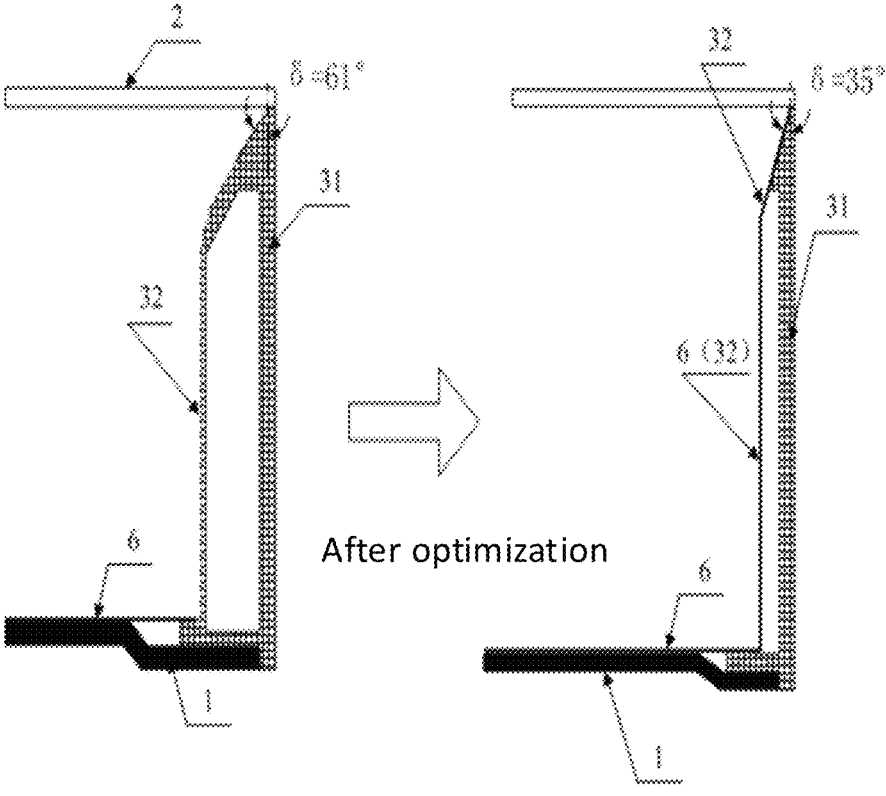
FIG. 29 is a schematic diagram of changing an inclination angle of a first reflection bevel provided by an embodiment of the present disclosure.
Figure 30:
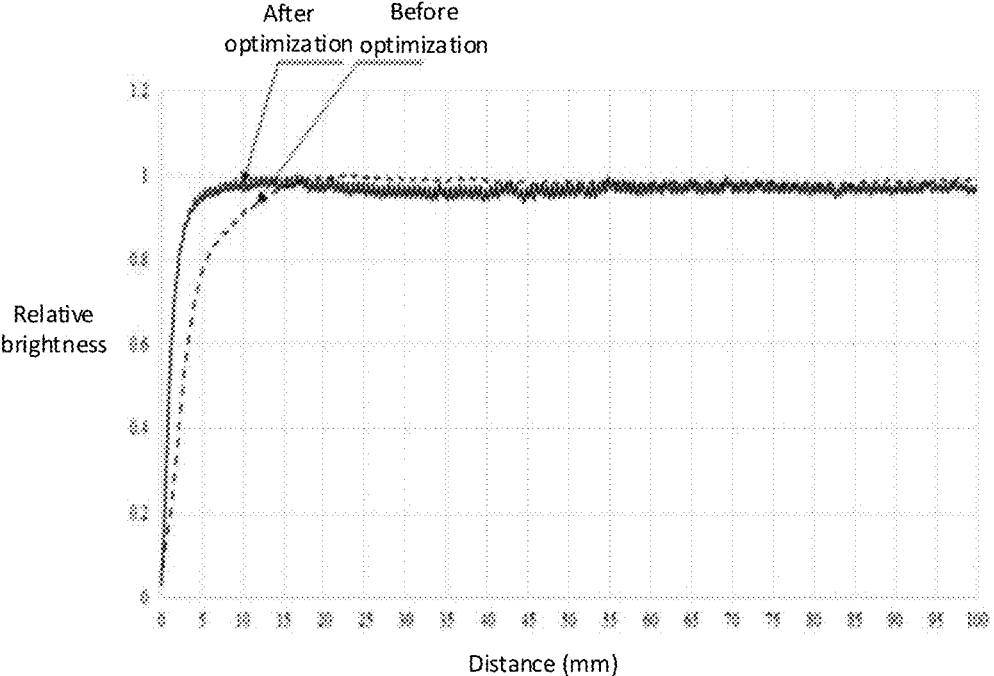
FIG. 30 shows a curve graph of edge brightness before and after optimization of a backlight module.

An inclination angle of a middle bezel 3 in an existing backlight module is optimized. A light mixing distance (i.e., the spacing between a backboard 1 and a diffusion plate 2) of the backlight module is OD=30 mm, a distance between a first light-emitting device 4a and an inner side wall of the middle bezel 3 is L1=32 mm, a distance L2 between centers of the first light-emitting device 4a and the second light-emitting device 4b is 60.5 mm, a brightness curve of the light-emitting devices 4 used in the backlight module is as shown in FIG. 3, and the inclination angle of a first reflection bevel 3s of the backlight module in an original solution is δ=61°. Now the solution of changing the inclination angle δ of the first reflection bevel 3s provided by the present disclosure is adopted. According to FIG. 3, it may be known that the minimum main light-emitting angle of the light-emitting devices 4 is 60°, and the maximum main light-emitting angle is 80°, i.e., $\alpha=\alpha'=60°$, and $\beta=\beta'=80°$. According to a foregoing formula for the range of the inclination angle δ of the first reflection bevel 3s, the range of 8 may be determined to 31.5°≤δ≤42°, and δ is changed from 61° in the original solution to 35°, as shown in FIG. 29 which is a schematic diagram of changing an inclination angle of a first reflection bevel provided by an embodiment of the present disclosure. After optimization by adopting the solution provided by the present disclosure, by measuring brightness within 80 mm of an edge of the backlight module, a brightness drop point of the edge decreases from original 15 mm from the edge to 5 mm, as shown in FIG. 30 which is a curve graph of edge brightness before and after optimization of a backlight module.

When the above optimized backlight module is adopted to form a splicing screen, a dark frame at an edge of the position of a splicing seam is ameliorated, and the splicing seam will not affect the vision during viewing from a distance.

Example 2

Based on example 1, a second reflection structure 5 is further added between the first light-emitting device 4a and the second light-emitting device 4b. According to the above solution provided by the present disclosure, parameters of the modified backlight module are obtained as OD=30 mm, L1=37 mm, L2=60.5 mm, a height of the second reflection structure 5 is H=6.6 mm, a distance between a vertical face 52 of the second reflection structure 5 and a center of the first light-emitting device 4a is L3=20.3, and a second reflection bevel 51 of the reflection structure has an inclination angle (i.e., a first included angle) γ=5°. By using Lighttools software to simulate example 1 and example 2, it may be determined that: in the solution of example 1, the brightness starts to decrease at 6 mm from the edge of the backlight module, the brightness of the edge region slightly increases, and the dark frame is narrowed; and in the solution of Example 2, the brightness starts to decrease at 3 mm from the edge of the backlight module, and there is no bright band or dark frame.

When light-emitting devices with the same parameters are used as the first light-emitting device and the second light-emitting device, their maximum main light-emitting angles are the same (i.e., $\beta=\beta'$), and their minimum main light-emitting angles are also the same (i.e., $\alpha=\alpha'$). When light-emitting devices with different parameters are used as the first light-emitting device and the second light-emitting device, their maximum main light-emitting angles may be different, and the minimum main light-emitting angles may also be the same.

It needs to be understood that the above examples only exemplarily show a verification process of a part of the solutions of the present disclosure, and the remaining solutions not shown may be verified in a similar manner, which will not be repeated here one by one.

Based on the same inventive concept, an embodiment the present disclosure provides a display apparatus, including: the backlight module as described above, where the backlight module is a direct-lit backlight module; and a display panel, located on a light emergence surface of the backlight module.

The display apparatus may be a liquid crystal display, a liquid crystal display screen, a liquid crystal television, or other display apparatuses; or may be a cell phone, a tablet computer, a laptop, or other mobile devices.

Although the preferred embodiments of the present disclosure have been described, those skilled in the art may make additional changes and modifications on these embodiments once they know the basic creative concept. So the appended claims are intended to be construed to include the preferred embodiments and all changes and modifications that fall into the scope of the present disclosure.

Apparently, those skilled in the art may make various modifications and variations to the present disclosure without departing from the spirit and scope of the present disclosure. In this way, if these modifications and variations of the present disclosure fall within the scope of the claims of the present disclosure and equivalent technologies thereof, the present disclosure is also intended to contain these modifications and variations.

What is claimed is:

1. A backlight module, comprising:
   a backboard and a diffusion plate arranged opposite to each other, and a middle bezel arranged along an edge region of the backboard, wherein the middle bezel abuts against the diffusion plate; and
   a plurality of light-emitting devices on a side of the backboard facing the diffusion plate; wherein the light-emitting device located on an outermost side among the plurality of light-emitting devices is a first light-emitting device; and in a first direction of the middle bezel pointing toward the first light-emitting device, the light-emitting device nearest the first light-emitting device is a second light-emitting device;
   wherein a distance between the first light-emitting device and an inner side wall of the middle bezel, and a distance between the first light-emitting device and the second light-emitting device meet that: a first major light beam emitted by the first light-emitting device toward the middle bezel is reflected by the middle bezel and then projected to a position between an orthographic projection of the first light-emitting device on the diffusion plate and an orthographic projection of the second light-emitting device on the diffusion plate, and a second major light beam emitted by the second light-emitting device toward the middle bezel passes through an abutting position of the middle bezel and the diffusion plate.

2. The backlight module according to claim 1, wherein a distance between the second light-emitting device and the inner side wall of the middle bezel meets that:
   at least a main light ray emitted by the second light-emitting device toward a side of the first light-emitting device at a minimum main light-emitting angle passes through the abutting position; or,
   at least a main light ray emitted by the second light-emitting device toward a side of the first light-emitting device at a maximum main light-emitting angle passes through the abutting position.

3. The backlight module according to claim 1 or claim 2, wherein a distance between the second light-emitting device and the inner side wall of the middle bezel ranges from $OD/\tan c_2$ to $OD/\tan b_2$;
   wherein OD is spacing between the backboard and the diffusion plate, $b_2$ is a complement angle of a maximum main light-emitting angle of the second light-emitting device, and $c_2$ is a complement angle of a minimum main light-emitting angle of the second light-emitting device.

4. The backlight module according to claim 3, wherein the distance between the first light-emitting device and the inner side wall of the middle bezel is in a range of $1/3\ OD/\tan c_1 \leq L1 \leq 1/3\ OD/\tan b_1$; wherein L1 is the distance between the first light-emitting device and the inner side wall of the middle bezel; $b_1$ is a complement angle of a maximum main light-emitting angle of the first light-emitting device; and $c_1$ is a complement angle of a minimum main light-emitting angle of the first light-emitting device;
   wherein the distance between the first light-emitting device and the second light-emitting device is in a range of $2/3\ OD/\tan c_2 \leq L2 \leq 2/3\ OD/\tan b_2$; wherein L2 is the distance between the first light-emitting device and the second light-emitting device.

5. The backlight module according to claim 2, wherein the distance between the first light-emitting device and the second light-emitting device is two times the distance between the first light-emitting device and the inner side wall of the middle bezel.

6. The backlight module according to claim 1, wherein the middle bezel has an inclined part and a vertical part;
   wherein the vertical part is located between the inclined part and the backboard and is in contact with the backboard; and the inclined part has a first reflection bevel toward a side where the first light-emitting device is located and abuts against the diffusion plate;
   wherein an inclination angle of the first reflection bevel meets that: the second major light beam is at least partially projected on the first reflection bevel, and the second major light beam after being reflected by the first reflection bevel is perpendicular to the diffusion plate; or, an edge of the second major light beam passes through the abutting position of the first reflection bevel and the diffusion plate;
   wherein a range of the inclination angle is:

$$(90°-c2)/2 \leq \delta \leq (90°-b2)/2;$$

wherein $\delta$ is the inclination angle, c2 is a complement angle of a minimum main light-emitting angle of the second light-emitting device, and b2 is a complement angle of a maximum main light-emitting angle of the second light-emitting device.

7. The backlight module according to claim 6, wherein a length of an orthographic projection of the first reflection bevel on the diffusion plate in the first direction meets that: a first major light beam emitted by the first light-emitting device toward a side of the middle bezel is projected on the vertical part, and the first major light beam after being reflected by the vertical part is projected on a position of the diffusion plate corresponding to a region between the first light-emitting device and the second light-emitting device; and/or, a length of the first reflection bevel in the first direction is: $L4=(OD-L1\times\tan c_1)\times\tan \delta$; wherein L4 is the length of the first reflection bevel in the first direction, OD is spacing between the backboard and the diffusion plate, L1 is the distance between the first light-emitting device and the middle bezel, c1 is a complement angle of a minimum main light-emitting angle of the first light-emitting device, and $\delta$ is the inclination angle of the first reflection bevel.

8. The backlight module according to claim 6, wherein the middle bezel comprises:

a first body of the inclined part; wherein the first body has a first face, a second face, a bevel and a connection structure connected sequentially; the first face intersects with the diffusion plate;

the second face is parallel to and not in contact with the diffusion plate; the bevel is located on a side of the first face close to the first light-emitting device, and an end of the bevel abuts against the diffusion plate; and the connection structure extends from the second face toward a side of the backboard, and is perpendicular to the second face; and a first reflection structure on a side of the first body close to the first light-emitting device, wherein one part of the first reflection structure belongs to the inclined part, and the other part of the first reflection structure belongs to the vertical part.

9. The backlight module according to claim 8, wherein an end of the connection structure away from the diffusion plate is not in contact with a side of the backboard facing the diffusion plate, and the connection structure has a mounting hole in the first direction;

wherein the backboard comprises: a second body parallel to the diffusion plate; and a frame, along an edge of the second body, extending toward the diffusion plate to arrive at a side of the connection structure away from the first light-emitting device, wherein the frame has a through hole penetrating through the frame at a position corresponding to the mounting hole, and a connection member passes through the through hole and the mounting hole to fixedly connect the frame to the connection structure;

and/or, the connection structure extends from the second face to a side of the backboard facing the diffusion plate and is perpendicular to the second face; and an end of the connection structure away from the diffusion plate abuts against the backboard, and a surface of the connection structure away from the first reflection structure is flush with the first face and an end face of the diffusion plate.

10. The backlight module according to claim 9, wherein a longitudinal profile of the connection structure is in an L shape; and an end, away from a second part parallel to the diffusion plate, of a first part of the L shape perpendicular to the diffusion plate is connected to the second face; and the second part is located on a side of the backboard close to the diffusion plate;

wherein the backboard comprises a first region and a second region surrounding the first region, and a distance between a part of the backboard in the first region and the diffusion plate is less than a distance between a part of the backboard in the second region and the diffusion plate; and the second part is located in the second region, and a height of the second part is a height difference between the part of the backboard in the first region and the part of the backboard in the second region;

wherein the second part further comprises a protrusion, and the protrusion is located on a side of the second part close to the diffusion plate.

11. The backlight module according to claim 8, wherein the first body further comprises:

a vertical structure on a side of the connection structure close to the light emitting device, wherein a side of the vertical structure close to the light emitting device is connected to the bevel, and a side of the vertical structure close to the diffusion plate is connected to the second face.

12. The backlight module according to claim 11, wherein the vertical structure further has an extending portion;

wherein an end of the extending portion away from the diffusion plate extends toward the side where the first light-emitting device is located; and the extending portion is parallel to the diffusion plate and in contact with a side of the backboard close to the diffusion plate.

13. The backlight module according to claim 11, wherein the first body further comprises:

a transition structure, connected between the vertical structure and the second face, wherein a side of the transition structure facing the side where the first light-emitting device is located is connected between the bevel and a side of the vertical structure, and the side of the vertical structure facing the side where the first light-emitting device is located.

14. The backlight module according to claim 8, wherein the backlight module further comprises a reflection sheet, and the reflection sheet is located on a side of the backboard facing the diffusion plate;

and/or, the first body is integrally formed by adopting an injection molding process, and the first reflection structure is a reflection film; and a material adopted by the first body is a metal, and the reflection sheet on the side of the backboard facing the diffusion plate extends along a surface of the first body facing the side where the first light-emitting device is located to the diffusion plate, to form the first reflection structure.

15. The backlight module according to claim 1, further comprising:

a second reflection structure, fixed to the side of the backboard facing the diffusion plate, and located between the first light-emitting device and the second light-emitting device; wherein the second reflection structure has a second reflection bevel, and the second reflection bevel is used for reflecting a third major light beam formed by main light rays emitted by the first light-emitting device toward a side where the second light-emitting device is located, the third major light beam illuminates a region surrounding a position where the middle bezel abuts against the diffusion plate, and the second reflection structure does not block the second major light beam.

16. The backlight module according to claim 15, wherein the second reflection structure further comprises: a vertical face, facing the second light-emitting device and intersecting with the second reflection bevel; and a bottom face, located on the side of the backboard facing the diffusion plate, and connecting the vertical face to the second reflection bevel;

and/or, the second reflection structure further comprises: a plurality of fixing structures, one end of each the plurality of fixing structures is connected to the bottom face of the second reflection structure, and the other end of each fixing structure has a hook extending in a direction where the second reflection structure is located; wherein the second reflection structure and the plurality of fixing structures are integrally formed by adopting an injection molding process.

17. The backlight module according to claim 16, wherein a height of the vertical face meets that: a main light ray emitted by the first light-emitting device toward the second reflection bevel at a minimum main light-emitting angle arrives at the diffusion plate after being reflected by the second reflection bevel; and the vertical face does not block a main light ray emitted by the second light-emitting device toward the side of the first light-emitting device at a maximum main light-emitting angle; and an included angle of the second reflection bevel and the vertical face meets that: a main light ray emitted by the first light-emitting device toward the second reflection bevel at a maximum main light-emitting angle intersects with the second reflection bevel, and arrives at the middle bezel after being reflected by the second reflection bevel.

18. The backlight module according to claim 17, wherein the included angle meets following constraints:

$\tan(180°+b_1-2\gamma) \geq (L5-H1)/(L3-L5)$; and $\tan(180°+c_1-2\gamma) \leq (OD-H)/(L1+L3)$;

wherein $L5 = L3 (\tan c_1 - \tan b_1)/(\tan \gamma - \tan b_1)$; and $H1 = L3 \times \tan c - L3 \times \tan \gamma(\tan c_1 - \tan b_1)/(\tan \gamma - \tan b_1)$;

wherein $\gamma$ is the included angle, $b_1$ is a complement angle of the maximum main light-emitting angle of the first light-emitting device, $c_1$ is a complement angle of the minimum main light-emitting angle of the first light-emitting device, L1 is a distance between the first light-emitting device and the middle bezel, L2 is a distance between the first light-emitting device and the second light-emitting device, L3 is a distance between the first light-emitting device and the vertical face, the vertical face is parallel to a centerline of the first light-emitting device, H is the height of the vertical face, and OD is spacing between the backboard and the diffusion plate.

19. The backlight module according to claim 17, wherein the height of the vertical face meets a following constraint:

$$H = (L2-L3) \times \tan b_1 = L3 \times \tan c_1;$$

wherein H is the height of the vertical face.

20. A display apparatus, comprising:

the backlight module according to claim 1; and a display panel on a light emergence surface of the backlight module.

\* \* \* \* \*